(12) United States Patent
Conversano et al.

(10) Patent No.: US 10,919,649 B2
(45) Date of Patent: Feb. 16, 2021

(54) LOW-POWER HALL THRUSTER WITH AN INTERNALLY MOUNTED LOW-CURRENT HOLLOW CATHODE

(71) Applicant: CALIFORNIA INSTITUTE OF TECHNOLOGY, Pasadena, CA (US)

(72) Inventors: Ryan W Conversano, Pasadena, CA (US); Dan M Goebel, Pasadena, CA (US); Ira Katz, Pasadena, CA (US); Richard R Hofer, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/904,440

(22) Filed: Jun. 17, 2020

(65) Prior Publication Data

US 2020/0317374 A1 Oct. 8, 2020

Related U.S. Application Data

(63) Continuation of application No. 16/205,048, filed on Nov. 29, 2018, now Pat. No. 10,723,489.

(60) Provisional application No. 62/645,072, filed on Mar. 19, 2018, provisional application No. 62/644,728, filed on Mar. 19, 2018, provisional application No. 62/640,185, filed on Mar. 8, 2018, provisional application No. 62/595,306, filed on Dec. 6, 2017.

(51) Int. Cl.
*B64G 1/40* (2006.01)
*F03H 1/00* (2006.01)

(52) U.S. Cl.
CPC ........... *B64G 1/405* (2013.01); *F03H 1/0012* (2013.01); *F03H 1/0075* (2013.01)

(58) Field of Classification Search
CPC ........ F03H 1/00; F03H 1/0012; F03H 1/0025; F03H 1/0062–0075; H01J 27/143; H01J 27/146; B64G 1/405
See application file for complete search history.

(56) References Cited

U.S. PATENT DOCUMENTS

| 5,646,476 A * | 7/1997 | Aston | F03H 1/0075 313/154 |
| 9,934,929 B1 * | 4/2018 | Martinez | H01J 27/143 |
| 2017/0088293 A1 * | 3/2017 | Zurbach | F03H 1/0075 |
| 2017/0284380 A1 * | 10/2017 | Hofer | F03H 1/0075 |

OTHER PUBLICATIONS

Loyan "Middle power Hall Effect Thrusters with centrally located cathode" (Year: 2013).*
Goebel "Fundamentals of Electric Propulsion: Ion and Hall Thrusters" (Year: 2008).*

* cited by examiner

Primary Examiner — Gerald L Sung
Assistant Examiner — William L Breazeal
(74) Attorney, Agent, or Firm — Steinfl + Bruno LLP

(57) ABSTRACT

A low-power Hall thruster gains significantly improved efficiency by a combination of features, including a single piece, h-shaped magnetic screen which enables a more efficient internal volume utilization as well as optimal magnetic shielding; an internally mounted cathode with varying diameter further decreases the footprint of the thruster; an anode with multiple baffles connected by axially oriented holes generates a highly azimuthally uniform propellant flow.

12 Claims, 28 Drawing Sheets

LOW-POWER HALL THRUSTER WITH AN INTERNALLY MOUNTED LOW-CURRENT HOLLOW CATHODE

CROSS REFERENCE TO RELATED APPLICATIONS

The present application is a continuation of U.S. patent application Ser. No. 16/205,048, filed on Nov. 29, 2018, which claims priority to U.S. Provisional Patent Application No. 62/640,185, filed on Mar. 8, 2018, U.S. Provisional Patent Application No. 62/644,728, filed on Mar. 19, 2018, U.S. Provisional Patent Application No. 62/645,072, filed on Mar. 19, 2018, and U.S. Provisional Patent Application No. 62/595,306, filed on Dec. 6, 2017, the disclosures of all of these being incorporated herein by reference in their entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to Hall thrusters. More particularly, it relates to a low-power, long-life, high-efficiency Hall thruster with an internally-mounted ultra-compact low-current hollow cathode.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
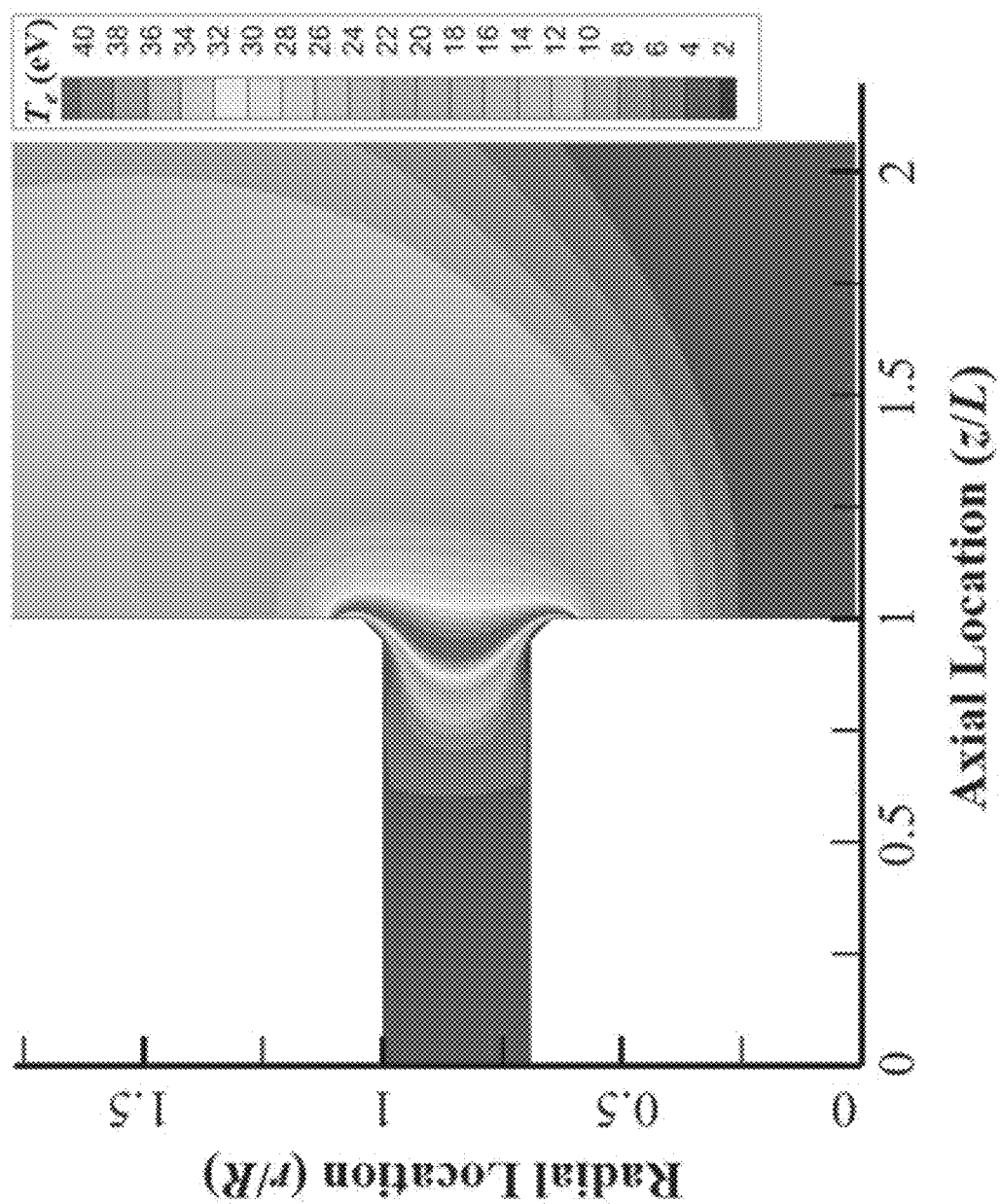
FIG. 1 illustrates predicted electron temperature contours based on numerical simulations using the 2D axisymmetric Hall thruster plasma modeling tool Hall2De.

In a first aspect of the disclosure, a Hall thruster is described, the Hall thruster comprising: a center axis oriented from an upstream section of the Hall thruster, the upstream section housing a back pole for a magnetic circuit and a supply line for a gas propellant, to a downstream section adjacent to an azimuthally-symmetrical discharge chamber; and a single-piece azimuthally-symmetrical magnetic screen, wherein: the azimuthally-symmetrical discharge chamber has an annular shape, the single-piece azimuthally-symmetrical magnetic screen has an h-shape cross section, the h-shape cross section comprising a first prong at an upstream end and two prongs at a downstream end, the single-piece azimuthally-symmetrical magnetic screen comprises a first hollow cylinder physically contacting the back pole at a single circular point of contact, the single-piece azimuthally-symmetrical magnetic screen comprises a second and third hollow cylinders, the second hollow cylinder being concentric to the third hollow cylinder, and the azimuthally-symmetrical discharge chamber comprises a radially-outward wall and a radially-inward wall, the second hollow cylinder of the single-piece azimuthally-symmetrical magnetic screen encircles the radially-inward wall of the azimuthally-symmetrical discharge chamber, and the third hollow cylinder of the single-piece azimuthally-symmetrical magnetic screen encircles the radially-outward wall of the azimuthally-symmetrical discharge chamber, thereby forming a magnetic field protecting the radially-outward wall and the radially-inward wall of the azimuthally-symmetrical discharge chamber from erosion due to ion bombardment.

In a second aspect of the disclosure, a Hall thruster is described, the Hall thruster comprising: a center axis oriented from an upstream section of the Hall thruster, the upstream section housing a back pole for a magnetic circuit and a supply line for a gas propellant, to a downstream section adjacent to an azimuthally-symmetrical discharge chamber; and an internally-mounted cathode along the center axis, the internally-mounted cathode having a variable diameter, wherein: the internally-mounted cathode comprises an upstream section and a downstream section, and the upstream section is axially longer than the downstream section.

In a third aspect of the disclosure, a Hall thruster is described, the Hall thruster comprising: a center axis oriented from an upstream section of the Hall thruster, the upstream section housing a back pole for a magnetic circuit and a supply line for a gas propellant, to a downstream section adjacent to an azimuthally-symmetrical discharge chamber; and an azimuthally-symmetrical anode within the azimuthally-symmetrical discharge chamber, wherein: the azimuthally-symmetrical anode comprises a plurality of baffles configured to increase azimuthal flow uniformity for the gas propellant, the plurality of baffles comprises at least: a first baffle comprising a first plurality of holes connecting the first baffle to the supply line; a second baffle adjacent to the first baffle and connected to the first baffle through a second plurality of holes; and a third baffle adjacent to the second baffle and connected to the second baffle through a third plurality of circular holes, the first baffle is upstream of the second baffle, the second baffle is upstream of the third baffle, the first, second and third baffles are azimuthally-symmetrical, the third baffle comprises a radially-inward surface and a radially-outward surface, and the third baffle comprises a fourth plurality of holes on the radially-inward and radially-outward surfaces.

DETAILED DESCRIPTION

The present disclosure describes Hall thrusters with several improvements in the generation of a magnetically shielding field topology, the propellant flow uniformity, and the internal hollow cathode. Hall thrusters are described comprising one or more of such improvements, enabling, in some embodiments, the construction of a low-power, long-life, high-efficiency Hall thruster with an internally-mounted ultra-compact low-current hollow cathode. In some embodiments, a Hall thruster may comprise only one of the features described in the present disclosure, while in other embodiments, more than one, or even all such features can be incorporated in a single Hall thruster.

In the following, the present disclosure describes the development and performance testing of a low-power magnetically shielded Hall thruster with an internally-mounted hollow cathode. The low current cathode demonstrated stable current-voltage characteristics and thermal performance over the operational range of sub-kW Hall thrusters. In some embodiments, the cathode uses a standard sheathed heater to heat the thermionic emitter prior to cathode ignition. However, heaterless ignition testing revealed a predictable start-up behavior and provided insight into the system-level architecture required for reliable heaterless ignitions. Therefore, in some embodiments, the cathode may be heaterless. An exemplary anode gas feed design used in the Hall thruster demonstrated a maximum peak-to-peak pressure variation of 3.2% and 2.6% at propellant flow rates of 1 mg/s and 3 mg/s, respectively. Initial testing was carried out at 300 V and 500 W in a non-optimized operating condition demonstrating 41% total efficiency with a total specific impulse of 1320 s. Visual observations of the plasma discharge, post-operation observation of the carbon-coated discharge channel walls, as well as the results from plasma simulations provide strong evidence of magnetic shielding. High speed diagnostics recorded normal breathing mode oscillation behavior in the 20-50 kHz range and captured additional modes at frequencies greater than 200 kHz, possibly associated with azimuthal discharge plasma spokes or the cathode.

NASA's growing interest in small, compact satellites, generally termed as belonging to the SmallSat class of interplanetary spacecraft, has encouraged the development of numerous solar electric propulsion (SEP) technologies, especially low-power Hall thrusters. First developed for flight applications in Russia in the 1960's-1970's, Hall thrusters have been flown on hundreds of Earth-orbiting spacecraft and are beginning to be considered and selected for deep-space scientific missions. Recent mission studies show that a low-power Hall thruster designed for long-life, high efficiency operation would be enabling for interplanetary missions using sub-350 kg spacecraft. However, commercially available flight-proven low-power (sub-kW) Hall thrusters are generally limited to sub-50% efficiencies and maximum lifetimes of the order of a few thousand hours. For example, BHT-200 is a flight-proven 200 W thruster capable of 11-13 mN of thrust and 1,200-1,600 s of specific impulse ($I_{sp}$) at a total efficiency of 30-40% with a total demonstrated throughput of around 6 kg Xe (~2',000 h). As another example, the 350 W SPT-50 has demonstrated up to 2,500 h of flight operation (~19 kg Xe throughput) and produces a thrust of 20 mN and an $I_{sp}$ of 1,100-1,300 s at a total efficiency of 33-35%. The SPT-70, a flight demonstrated thruster with a maximum operation time of 3,100 h (~28 kg Xe throughput), produces 40 mN of thrust and 1,450-1,500 s of $I_{sp}$ at a total efficiency of 45-48% and a nominal power of 650-700 W. Two key commonalities exist between current flight-proven Hall thrusters, including BHT-600 and SPT-70: they use predominantly radial (i.e. unshielded) magnetic field topologies, which limits thruster lifetime, and they use an externally mounted hollow cathode.

Unshielded magnetic field topologies have been shown to induce life-limiting ion-bombardment sputter erosion of the discharge channel enhanced by high-energy electron losses to the channel surfaces. As known to the person of ordinary skill in the art, magnetic shielding of Hall thrusters has been shown to significantly increase the useful lifetime of Hall thrusters, by reducing the kinetic energy of ions on trajectories to impact the discharge channel surfaces. The kinetic energy is reduced below the material's sputtering threshold, thereby preventing (or reducing by orders of magnitude) ion-bombardment erosion of the discharge channel. Magnetic shielding can also reconfigure the magnetic field lines, thereby controlling the trajectories of ions and prevent impacts against surfaces. A dramatic reduction in plasma-wall interactions on both low-power and high-power Hall thrusters, corresponding to up to a 1000× increase in life and no significant detriments to performance, has been computationally and experimentally demonstrated.

Hollow cathodes used in flight Hall thrusters of all power levels have traditionally been mounted externally to the thruster's magnetic circuit, as is the case for all of the flight thrusters mentioned above. In lower-power thrusters, this is primarily due to the lack of space along the thruster centerline axis to simultaneously accommodate an internally-mounted cathode and generate the desired magnetic field. Studies comparing externally and internally mounted hollow cathodes on mid and high power thrusters have demonstrated higher performance and efficiency, reduced discharge oscillations, improved cathode-thruster coupling (i.e. lower cathode-ground voltage), improved plume symmetry, and decreased beam divergence (i.e. improved thruster performance), when using an internal hollow cathode. Thruster performance and efficiency has been shown to increase by as much as 5% when using an internally-mounted cathode compared to an external cathode. Internal cathode thruster configurations appear to minimize finite pressure effects during ground tests, while thrusters using external cathodes have shown non-flight-like coupling behaviors with the surrounding vacuum chamber (i.e. discharge current distributions). Furthermore, the high sensitivity of thruster performance to cathode positioning (directly related to thruster-cathode coupling) requires large rigid mounting brackets to precisely position a cathode. This requirement significantly increases the thruster's footprint, adds mass, increases the risk of damage during testing and spacecraft integration, and reduces the thruster's resistance to vibration loads, due to its asymmetric geometry. Therefore, using an internal cathode, it is possible to obviate the need for such brackets. In some embodiments, the cathode is therefore mounted internally and not externally in a bracket.

The person of ordinary skill in the art will understand that the Hall thrusters described in the present disclosure allow high efficiency spacecraft to be launched for different space missions, having several advantages over more conventional ways for propulsion. For example, large chemical boosters can be utilized for SmallSat propulsion at the expense of adding hundreds of kilograms to the launch mass of the spacecraft. However, an efficient, low power, long life Hall thruster can fit within a SmallSat's mass and power budget, offering both the propulsive capability to travel to deep space targets, as well as significant maneuverability (such as second celestial body trajectory, plane-change, orbit raising, etc.) upon arrival. In addition, conventional spacecraft (mass ~500-1,000 kg) traveling to Jupiter and beyond using chemical and/or electric propulsion suffer from limited mobility and orbit-insertion capabilities at their targets, due to either the high propellant masses required for impulsive maneuvers or the low solar power (<750 W) available at the target location.

A low power, high efficiency Hall thruster, however, can provide mission-enabling maneuverability (orbit insertion, orbit and inclination changes, etc.) using <500 W of power. This power level is reasonably attainable with solar power generator or a radioisotope thermoelectric generator. This propulsive capability at low power is currently unmatched by chemical systems of the same scale, especially given the small size and mass (including the required propellant) of modern SEP systems.

To enable the development of a low-power, long-life, high-efficiency SEP system is enabled by the low-power magnetically shielded Hall thruster described in the present disclosure, as well as the ultra-compact low-current hollow cathode that can be mounted internally to the low-power Hall thruster. Magnetic shielding (MS) field topology has been used in to both high and low-power Hall thrusters, however avoiding saturation of the magnetic circuit in low-power magnetic shielding devices is considerably more challenging due to constraints on the thruster's size and power level. These constraints place sever limits on the design and size of the center magnetic core, which has previously prohibited the use of a center-mounted cathode. Furthermore, maintaining high efficiency at low powers is a complicated optimization of the various design parameters of the thruster and been shown to lead to lower total efficiency in exchange for longer operational life.

The many advantages of MS shown by high power Hall thrusters, including the use of an on-axis center mounted cathode, would be beneficial to low power devices, however no flight-qualified low-power thrusters have been developed using these technologies. Hollow cathodes used in flight Hall thrusters have traditionally been mounted externally to the thruster's magnetic circuit, due to the lack of space on axis in the center magnetic pole to accommodate an internally mounted cathode.

In fact, numerous Hall thrusters have shown a high degree of sensitivity to the placement of the external hollow cathode relative to the magnetic field topology. To compensate, large mounting brackets have been implemented in flight thrusters, to position conventionally sized cathodes in exactly the right location. These brackets position the cathode externally to the thruster, and therefore significantly increase the thruster's footprint. The brackets also add heavy fixtures cantilevering the cathode, which can be easily bumped or damaged during spacecraft integration. There are numerous advantages to having the hollow cathode on axis, but there is no available space in conventional flight thrusters and there are no cathodes small enough to fit in the very limited space available on axis on a <1 kW Hall thruster that can still provide the required >10 kh life.

The solution to this problem is the development of a low power MS Hall thruster capable of accepting an internally-mounted ultra-compact hollow cathode. The low power thruster specification results in a low current requirement from the cathode, which allows very small cathodes to be designed and used. The thruster's magnetic circuit is specifically designed to avoid magnetic saturation while still providing sufficient space for the cathode to be mounted along the centerline axis. The center core design features a novel downstream counterbore where the cathode is inserted that maximizes the magnetic material available while allowing enough space for the ultra-compact cathode. These features (optimized magnetic core shape and ultra-compact cathode geometry) combine to maintain the thruster's performance.

The MaSMi (Magnetically Shielded Miniature) Hall thruster program, which pioneered the first low-power magnetically shielded Hall thruster in 2012, has aimed to develop a low-power high efficiency Hall thruster capable of Xe throughput higher than 100 kg. Several iterations of the MaSMi thruster have been developed, the most recent of which (the MaSMi-60) showed three key design features that limited the thruster's performance: An over-shielded magnetic field configuration, leading to increased beam divergence; insufficient magnetic field strength, leading to poor current utilization; and poor propellant flow distribution from the anode, leading to poor mass utilization.

During recent experiments, the MaSMi-60-LM2 demonstrated an 8% increase in total efficiency (10% increase in anode efficiency) through an optimization of the magnetic circuit to address the overshielding and insufficient magnetic field strength. The poor propellant flow distribution will be addressed below in the present disclosure.

A version of a MaSMi thruster is termed MaSMi-DM, a magnetically shielded low-power Hall thruster. The MaSMi-DM thruster builds on the design of the MaSMi-60-LM2 but incorporates several significant improvements. The MaSMi-DM is designed to accept MaSMi's LUC (Low current Ultra compact Cathode), an internally-mounted low-current ultra-compact hollow cathode. At the core of MaSMi's LUC is a barium oxide impregnated tungsten (BaO—W) cathode insert with an outer diameter of 4 mm, an inner diameter of 2 mm, and a length of 7.25 mm. The person of ordinary skill in the art will understand that in some embodiments other dimensions may be used for the cathode insert or other parts of the thrusters of the present disclosure. In an effort to reduce future production costs of MaSMi's LUC, the cathode tube was fabricated from high-temperature stainless steel (a relatively unconventional material for this application) with an e-beam welded tantalum orifice plate. In this embodiment, the cathode tube was wrapped in a commercially available, 1.6 mm diameter, swaged tantalum heater, followed by 10 layers of 0.025 mm thick tantalum foil as a radiation shield. The graphite keeper had an outer diameter of 13 mm.

MaSMi's LUC was designed for use in the long-life MaSMi-DM Hall thruster, therefore estimates of the cathode's insert life can be calculated using a barium depletion model. The cathode insert geometry and expected discharge current act as inputs to the model, which in this case are the dimensions stated above, and a value of 3 A for the current—a reasonable upper-bound estimate of the discharge current expected from the MaSMi-DM. The current density (J) across the inner surface of the cathode insert is calculated from:

$$J = \frac{I_D}{\pi d_i L} \quad (1)$$

where $I_d$ is the discharge current, $d_i$ is the cathode insert inner diameter, and L is the cathode insert length. The maximum operating temperature ($T_{max}$) along the cathode insert is then approximated using a two-dimensional (2D) cathode temperature model. This model uses an assumed temperature drop across the insert, as well as its geometry and material, in an interpolation scheme to determine the insert temperature required to generate the average current density found in Eq. (1). The operating time to deplete the barium in the insert to a depth of 100 μm ($\tau_{100\,\mu m}$) can be calculated to be $$\ln \tau_{100\mu m} = \frac{eV_a}{kT} + C_1 = \frac{2.8482e}{kT} - 15.668 \quad (2)$$

where e is the elementary charge, $V_a$ is the activation energy, k is Boltzmann's constant, T is the temperature in Kelvin, and $C_1$ is a fit coefficient. The cathode operating lifetime $\tau_{life}$ can then be derived using Eq. (2) together with the fact that the depletion depth is proportional to the square root of the operating time:

$$\tau_{life} = \tau_{100\mu m} \left(\frac{y}{y_{ref}}\right)^2 \quad (3)$$

where y is the insert thickness and $y_{ref}$ is the barium depletion reference depth (in this case, 100 μm). Using Eqs. (1)-(3), the expected operational lifetime for the insert in the internal cathode (MaSMi's LUC) exceeds 36 kh for a calculated $T_{max}$ of 1233° C. and a 20% temperature drop across the cathode emitter length. The estimated lifetime increases to more than 160 kh for an assumed temperature of 1133° C., and decreases to 10 kh at 1333° C., both assuming the same 20% temperature drop across the insert.

The life of $LaB_6$ cathodes is determined primarily by evaporation of the insert surface at the temperatures required for thermionic emission. The thermionic emission current density (J) is given by the Richardson-Dushman equation:

$$J = AT^2 \exp(-e\phi/kT) \quad (1a)$$

where T is the surface temperature in Kelvin, e is the charge of an electron, and k is the Boltzman constant. Lafferty determined that for a $LaB_6$ surface in vacuum, $A=29$ $A/cm^2K^2$ and the work function $\phi=2.67$ eV. Previously published lifetime models of the $LaB_6$ cathode have always assumed a constant insert wall temperature due to the high thermal conductivity of $LaB_6$ and the use of a large cathode orifice diameter that produces a flat density profile inside the insert and relatively uniform heating. This uniform temperature assumption is supported by measurement of relatively flat axial plasma density profiles internal to the cathode by an internal scanning probe over a large range in current and cathode flow, suggesting relatively uniform heating. The life model calculated the temperature of the entire insert inner surface area required to produce the discharge current, and used that temperature to calculate an evaporation rate using Lafferty's measured evaporation rate for polycrystalline $LaB_6$ in vacuum. Lafferty has given an experimentally deduced formula for the evaporation rate that fit his data:

$$W = \frac{10^{(C-B/T)}}{\sqrt{T}} \quad (2a)$$

where W is the $LaB_6$ mass loss per unit surface area per time and B and C are constants, which according to Lafferty are $B=36,850$ K and $C=13$. The previous $LaB_6$ hollow cathode life model based on the Lafferty formula (Eq. 2a) adopted two conservative assumptions: the insert surface temperature is considered uniform along the entire area; and all the evaporated material is assumed to leave the insert region. The emission surface is then subjected to uniform evaporation and the insert inner diameter, together with the effective emission area, increases with time. Thus, the temperature required for emitting the same level of discharge current, calculated with the Richardson-Dushman equation (Eq. 1a), decreases and, as a consequence, the evaporation rate reduces with time. The insert lifetime ends when a pre-set minimum wall thickness is reached.

It should be noted that the emitter wall temperature of larger inserts than used in MaSMi's LUC have been found to vary along the insert length, as a function of the discharge current and cathode mass flow rates. The lifetime model can be revised to incorporate the measured surface temperature profile. The model discretizes the emitter into a series of disks and uses the polynomial fit of the temperature profile to assign a temperature for each disk along the emitter length. The model then evaluates the emitted current density from each disk using Eq. 1a, and compares the integral of the current emitted along the entire insert with the discharge current. If the total emission current does not match the discharge current, the code increases the polynomial fit of the temperature by adding a constant value until the emitted current reaches the discharge current observed in the experiment. This technique ignores the Schottky effect and back-flowing electron current to the emitter surface, from the tail of the Maxwellian distribution overcoming the cathode-sheath. The Schottky term is found to be small, and ignoring back-flowing electron current is a good assumption for low-pressure hollow cathodes because the sheath voltage is typically 3-5 times the electron temperature and the back-flow electron current is small[43].

The model described above can be used to calculate the evaporation rate at each disk using Eq. 2a, and determines the mass loss along the emitter length for a preset time step. The model increments the time and re-evaluates the total emitter material loss, until the surface reaches a minimum defined thickness or all the material is evaporated to determine the lifetime of the cathode. However, this complexity is not required for MaSMi's LUC because the $LaB_6$ emitter is short (<1 cm) and the calculated internal density profile is relatively flat. Therefore, uniform insert temperature profiles are anticipated. The existing model also does not account for redeposition, which reduces the evaporation rate by over a factor of 2, and therefore gives a conservative prediction of the lifetime of the insert.

Figure 14:
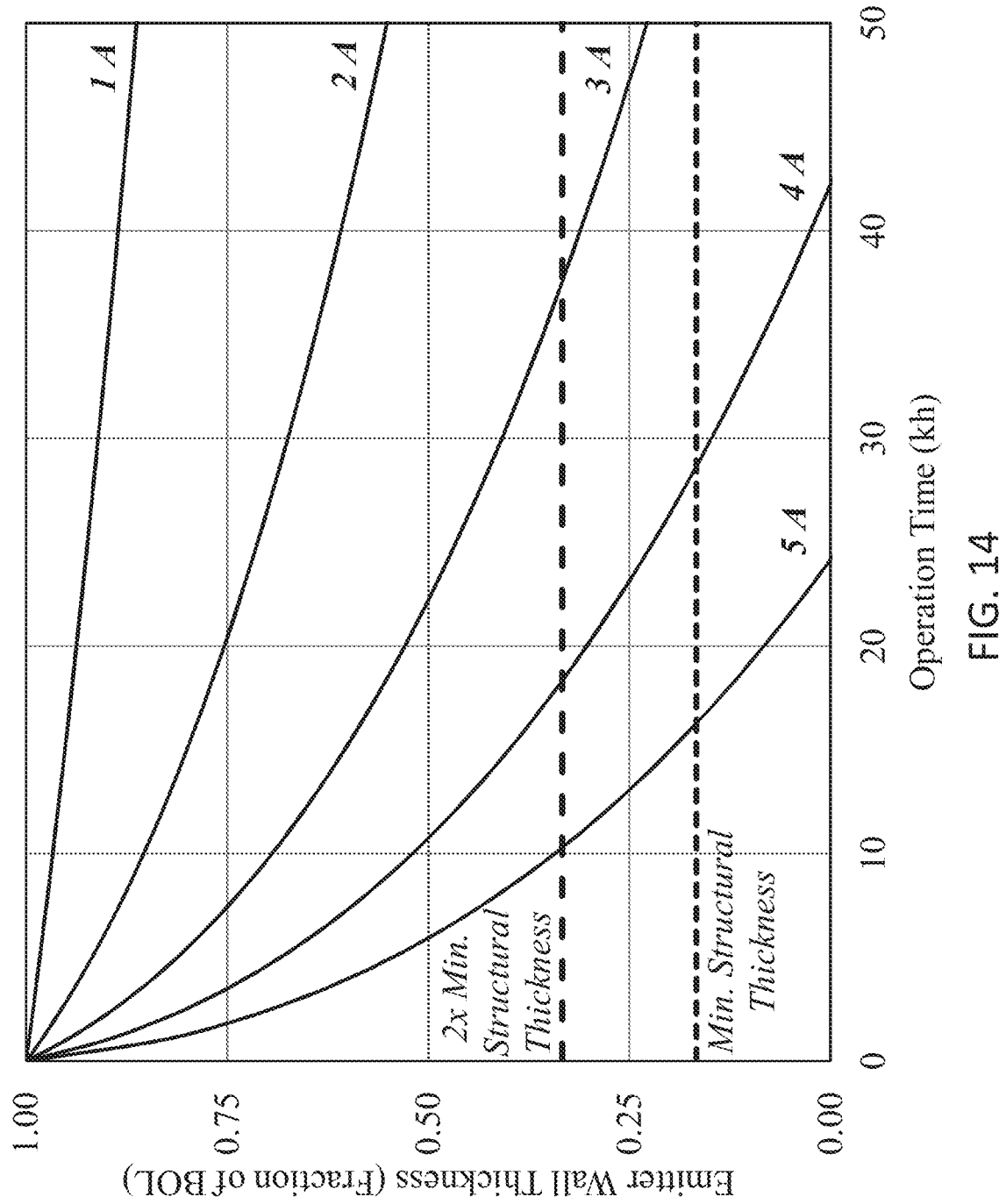
FIG. 14 illustrates the MaSMi-DM cathode's lanthanum-hexaboride thermionic emitter lifetime estimate as a function of discharge current.

Using the model described above, lifetime estimates as a function of discharge current can be calculated for MaSMi's LUC and illustrated as in FIG. 14. The end of the useful life of the $LaB_6$ emitter was considered as occurring when the insert wall thickness reached 17% of the beginning-of-life (BOL) condition, representing the minimum structural thickness of the insert. Assuming the emitter would only be used until twice its minimum structural thickness and recalling the lack of $LaB_6$ redeposition in the cathode life model, the useful life of MaSMi's LUC (with a margin of at least 2×) is 10 kh, 18 kh, and 37 kh at 5 A, 4 A, and 3 A of discharge current, respectively. These times correspond to a minimum total thruster propellant throughput of >200 kg Xe (using the flow rates recorded during hot-fire testing).

A further improvement of the thrusters of the present disclosure can be described with reference to the anode, which acts also as the gas distributor. The anode was redesigned to allow for radial propellant injection that reduces the axial velocity and achieves a highly uniform propellant distribution, azimuthally around the discharge channel. The magnetic circuit of the MaSMi-DM thruster was designed to replicate the topology generated by the MaSMi-60-LM2 thruster, with a capability for about 25% greater maximum radial field strength along the discharge channel centerline ($B_{r,max}$), at approximately half the magnet power. Previously, a power of more than 70 W was required at the thruster's operating temperatures. The goal of the new design was to improve total thruster efficiency by reducing electrical power used for components that do not directly contribute to thrust output (i.e. the magnet power), while enabling a greater range of field settings to be tested.

Thruster plasma modeling was completed using Hall2De, a 2D axisymmetric software code that allows for the simulation of the partially ionized gas in the r-z plane of Hall thrusters. Ions are modeled as a cold (compared to electrons) isothermal fluid with charge exchange and multiple ionization collisions accounted for in the momentum equations as a friction ("drag") force. For the neutral species, Hall2De assumes that the particles incident on a surface are fully accommodated, and that any re-emitted particles follow a cosine distribution. Therefore, the flux of neutrals on a given surface is a function of the view factor of that surface to all other surfaces, making the calculation of neutral particle distributions primarily based on geometry. A mass-conserving first-order upwind algorithm is used to step the neutral gas particles between grid cells, allowing the neutral density to change as a function of time despite the particles having a fixed velocity (based on the velocity distribution computed from the view factor particle flux model). A 2D form of Ohm's law in directions parallel and perpendicular to the magnetic field and the electron energy equations are discretized on a field-aligned computational mesh. The plasma potential is determined from Ohm's law combined with the current conservation equation. Experimentally-guided models of the anomalous collision frequency have enabled the results from Hall2De simulations to be validated against measured plasma parameters for numerous Hall thrusters.

The primary features that distinguish Hall2De from other r-z plane plasma codes are a magnetic field aligned mesh (MFAM), no discrete-particle methods, and a large computational domain.

Figure 2:
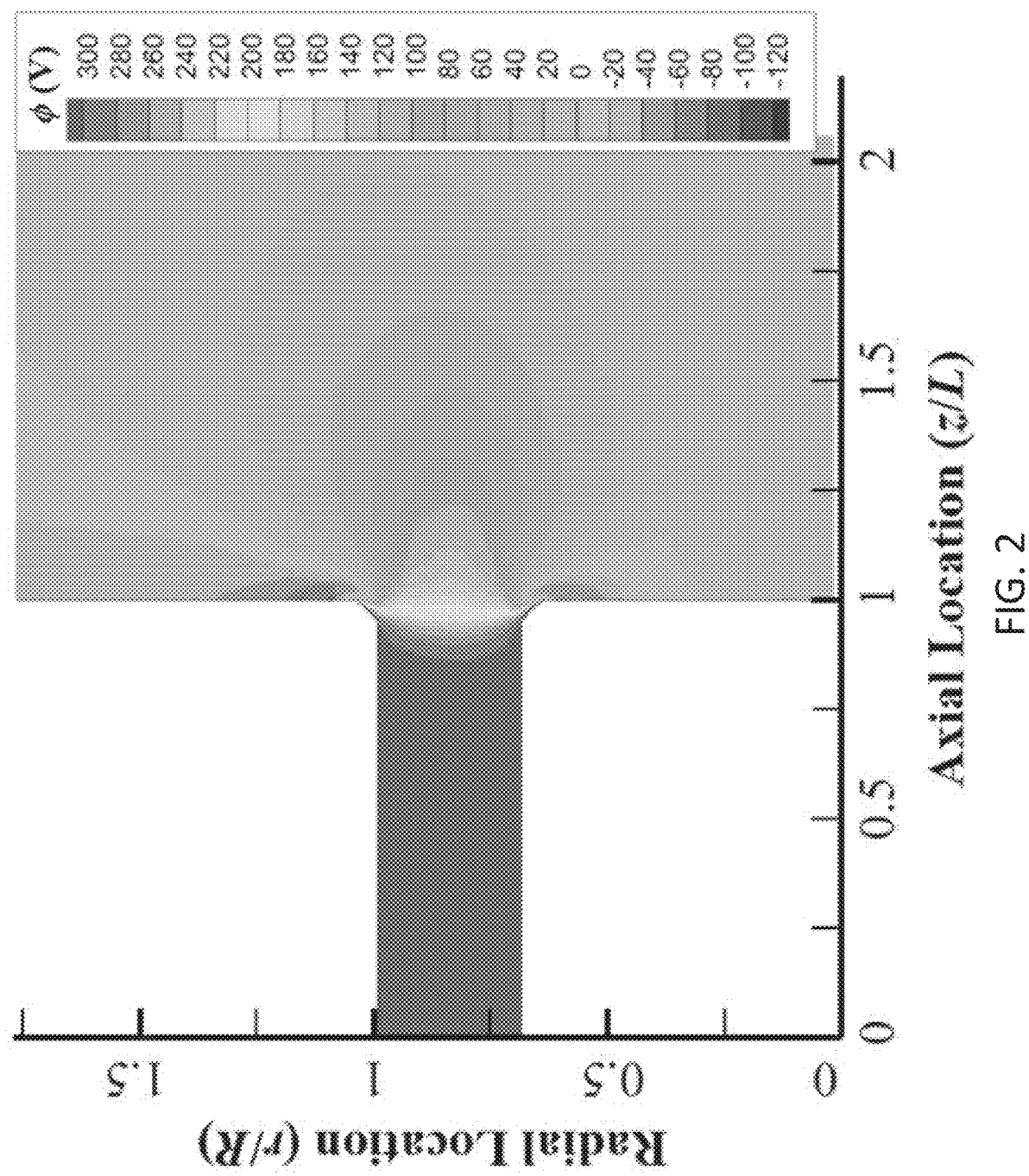
FIG. 2 illustrates predicted plasma potential contours based on numerical simulations using the 2D axisymmetric Hall thruster plasma modeling tool Hall2De.

Plasma simulations of the MaSMi-DM were performed at a discharge voltage ($V_d$) of 300 V and a discharge power of 500 W. This voltage and power were held constant while the magnetic field was varied across a range of magnetic field strengths. At all modeled field strengths, the fundamental tenants of magnetic shielding (i.e. low electron temperature and high plasma potential) were predicted as shown in the results for the electron temperature ($T_e$) and plasma potential ($\phi$) contours presented in FIGS. 1-2. Peak predicted performance corresponded to a thrust of 31.5 mN, an anode specific impulse of 1,590 s, and an anode efficiency of 48% occurring concurrently. FIG. 1 illustrates Hall2De-predicted electron temperature contours, while FIG. 2 illustrates plasma potential contours for the MaSMi-DM operating at 300 V and 500 W.

Erosion of the discharge channel walls (boron nitride, BN) and front pole covers (purified graphite) was estimated to approximate thruster lifetime. The peak erosion predicted on the discharge channel occurred along the inner wall at the highest magnetic field settings, while the peak pole cover erosion occurred on the inner pole cover at the lowest magnetic field setting. At the nominal magnetic field setting, peak discharge channel wall and pole cover erosion are predicted to be less than $5.3 \times 10^{-3}$ mm/kh and less than $7.8 \times 10^{-2}$ mm/kh, respectively, indicating a thruster operational lifetime greater than 10 kh, based on these erosion mechanisms and the thruster geometry.

Cathode characterization experiments were performed in a vacuum chamber measuring 1 m in diameter by 2 m in length. A pair of cryogenic pumps provided a xenon pumping speed of approximately 2.5 kl/s. A single ion gauge calibrated for xenon and mounted along the wall of the chamber provided pressure measurements. The nitrogen base pressure of the system was less than $5 \times 10^{-7}$ Torr. Operating pressures remained at less than $8.2 \times 10^{-5}$ Torr for characterization experiments (up to 0.29 mg/s Xe flow rate) and less than $9.1 \times 10^{-4}$ Torr for heaterless ignition experiments (up to 3.9 mg/s Xe flow rate). Commercially available power supplies and propellant flow controllers were used for all experiments. Research grade xenon was supplied to the cathode via electropolished stainless-steel propellant lines.

MaSMi's LUC was mounted on a custom cathode bracket containing isolated electrical terminals for the cathode's heater and keeper leads. A 75 mm diameter×100 mm long stainless steel hollow cylinder was used for an anode surface. The upstream opening of the anode was positioned 5 mm downstream of the cathode keeper exit plane.

Anode propellant flow uniformity experiments were conducted in a 2.6 m diameter by 5.2 m long cylindrical vacuum chamber. All internal surfaces of the chamber with line-of-sight to the thruster's discharge channel were covered with either graphite panels or carbon felt. Three cryopumps provided a xenon pumping speed of approximately 40 kl/s. The chamber pressure was monitored by a wall-mounted ionization gauge calibrated for xenon. The nitrogen base pressure of the system was less than $1 \times 10^{-7}$ Torr, and during operation with xenon flow of up to 3.0 mg/s, the chamber pressure remained less than $1 \times 10^{-5}$ Torr. Commercially available power supplies and propellant flow controllers were used for all experiments. Research-grade xenon was supplied to the thruster via electropolished stainless steel propellant lines.

To ensure the uniform distribution of neutral gas within the discharge channel, a series of flow tests were performed under vacuum using pitot tubes. This approach mirrors similar approaches used in the past to verify anode flow uniformity for Hall thruster propellant manifolds. The standard success criteria for flow (or pressure) uniformity used to accept a thruster anode manifold is ≤5% variation from the mean flow. Both the anode manifold and the discharge channel walls are included to ensure the flow is as representative as possible during thruster operation. Due to the small dimensions of the MaSMi-DM discharge channel, a ⅛" stainless steel tube with an inner diameter of 1.39 mm served as the pitot probe. This tube size was selected to obtain sufficient spatial resolution while minimizing perturbations of the flow environment. Based on previous pressure variation measurements, the pitot probe inlet was fixed radially along the channel centerline (b/2) and axially at the channel midpoint (L/2). A rotational stage was used to rotate the discharge channel and anode relative to the pitot probe, enabling the positioning of the pitot probe tip at a total of 36 equally-spaced azimuthal locations with ±0.0125° resolution.

Thruster performance testing was conducted in a vacuum facility as described above. For these tests, the chamber pressure was monitored by two ionization gauges calibrated for xenon. The first gauge used an S-shaped snorkel inlet and was positioned in the thruster exit plane approximately 60 cm radially from the thruster axis (the midpoint between the thruster and chamber wall); this was used as the primary indication of chamber pressure. The second gauge was mounted along the chamber wall just downstream of the thruster exit plane. Both ion gauges have a plasma screen (i.e. metallic mesh) at their respective inlets.

A water-cooled inclination-controlled inverted-pendulum thrust stand was used to measure the thrust of the MaSMi-DM. The thrust stand was calibrated by lowering and raising a series of precision masses. The calibration was performed before and after each experimental run, with thrust stand zeros performed after each thrust measurement. The thrust stand demonstrated a resolution of 0.1 mN with an estimated uncertainty of 2.0%. Combined with the other thruster system uncertainties (power supplies, flow controllers, etc.), the estimated uncertainty in the $I_{sp}$ and efficiency were 2.2% and 4.2%, respectively.

Three Type-K thermocouples were installed on the thruster to monitor temperature. The first was located on the upstream face of the thruster's back pole. The second was mounted on the outer diameter of the front outer pole, just upstream of the graphite pole cover. The third was embedded in the inner magnet coil. An additional 6 Type-K thermocouples were mounted throughout the thrust stand to monitor the thermal stability of the diagnostic.

The diagnostics rig to test the plasma is a removable structure that includes a flat Langmuir probe, an E×B probe, and a retarding potential analyzer. A shielded Faraday probe is mounted on a rotation stage centered at the thruster exit plane along the thruster's centerline axis. All thruster-facing surfaces of the probes and mounting hardware (with the exception of the probe measurement regions) were covered in graphite shielding. Measurement of the plasma discharge current and voltage oscillations were performed using broadband transducers coupled to a 12-bit 8-channel oscilloscope set to a 100 MHz sample rate. The current was measured on the anode side of the discharge supply with a Pearson 110 coil, providing upper frequency response of 20 MHz, and on the cathode side of the discharge supply with a shunt read into a digital multimeter to capture the DC response. The discharge (i.e. anode-to-cathode) and cathode-to-ground voltages were measured with separate active high-voltage differential probes.

To characterize the performance of MaSMi's LUC, two sets of experiments were conducted. The first involved mapping the discharge-current behavior of the cathode across a range of propellant flow rates. Normal heating of the cathode, using its swaged heater to achieve ignition, was used for these tests. The second set of experiments demonstrated the heaterless ignition capabilities of MaSMi's LUC.

Cathode experiments to characterize the discharge current-voltage behavior began with the same cathode ignition process following conditioning of the BaO—W insert. The heater was supplied with 5.5 A of current, providing less than 28 W of heater power, for 6 minutes. During the heating process, a 0.20 mg/s xenon flow rate was established in the cathode. The application of a 150 V keeper voltage ($V_k$) with a 2 A current limit consistently ignited MaSMi's LUC. With a 2 A keeper discharge established, the flow rate was altered for the desired condition. The discharge was then connected to the anode at the desired discharge current, followed by removal of the keeper current. The discharge current was then incrementally increased from the lowest stable condition to the highest while the discharge voltage was recorded. A dwell time of ≥5 minute at each condition was performed prior to taking data to allow the discharge to settle. Due to the added sputter erosion of the cathode, and potentially also of other thruster components, at high cathode discharge voltages (corresponding to large cathode-to-ground voltages during thruster operation), no data was collected for flow and current combinations yielding $V_d$>35 V.

Figure 3:
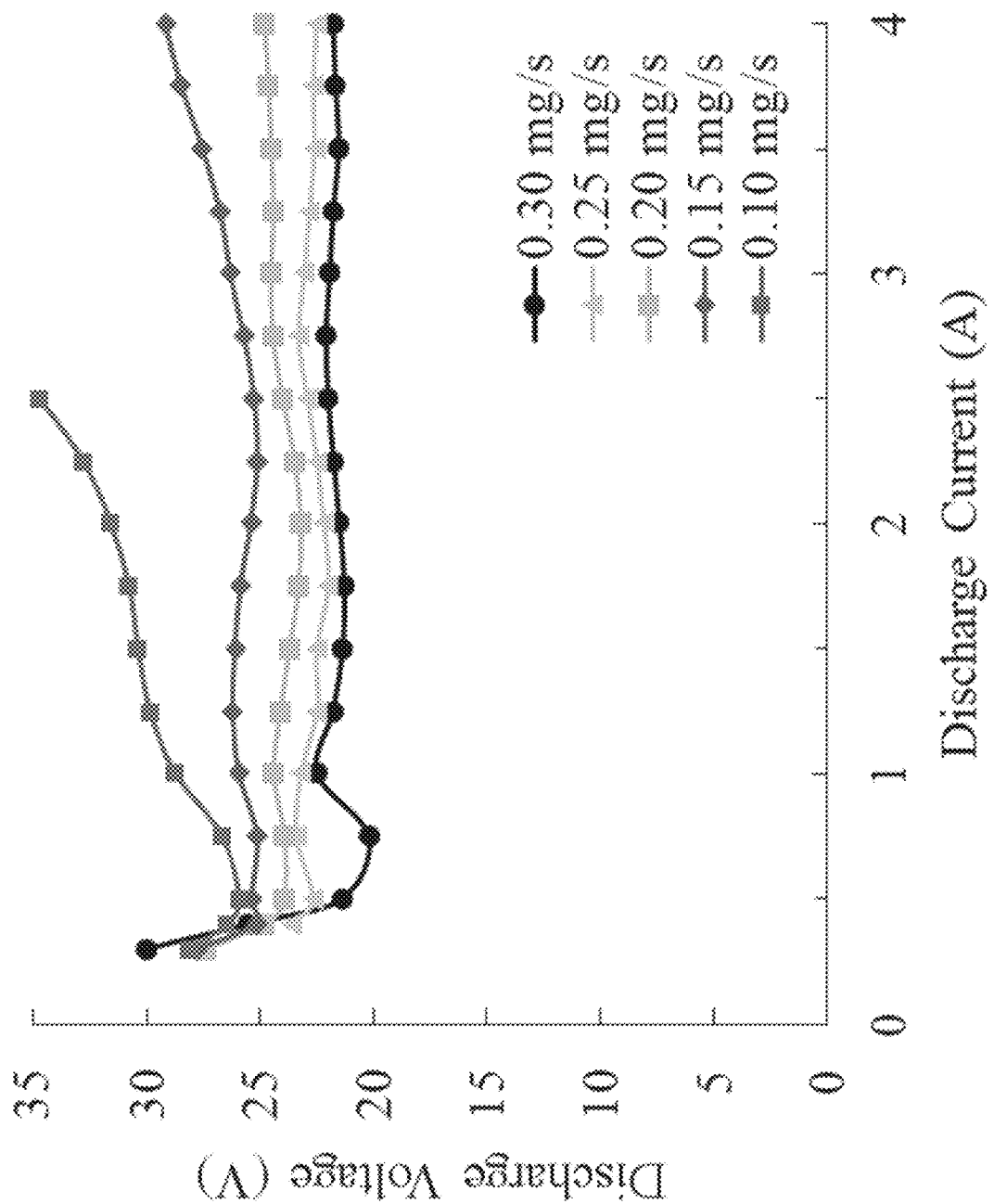
FIG. 3 illustrates the discharge current-voltage behavior of the first-generation ultra-compact hollow cathode.

The discharge voltage behavior of MaSMi's LUC as a function of discharge current and propellant flow rate was mapped to assess the compatibility of the compact cathode with the MaSMi-DM thruster. Flow rates were set from 0.10-0.30 mg/s in increments of 0.05 mg/s while the discharge current was varied from 0.2-4 A in increments of 0.1 A from 0.2-0.5 A and increments of 0.25 A from 0.5-4 A. Results are presented in FIG. 3 where conditions that did not yield a stable discharge are not reported. MaSMi's LUC demonstrated stable operation over the full range of expected thruster discharge currents. Discharge voltages remained flat from 0.5-4 A for all but the 0.10 mg/s flow rate, varying by <5 V in the worst case. This behavior suggests both an appropriate orifice sizing for the application as well as a strong thermal design (i.e. maintaining thermal isolation of the insert with minimal heat losses due to conduction and radiation).

A key single-point failure of a conventional hollow cathode is the heater, leading to the consideration of heaterless cathodes. Heaterless cathode ignition is known to the person of ordinary skill in the art. Heaterless cathode ignition consists of an electrical breakdown process between the keeper and cathode orifice or insert, leading to heating of the insert. Past experiments have revealed several unique potential failure mechanisms related to repeated heaterless ignitions, including barium depletion of the insert, arc breakdown damage of the cathode tube and orifice plate during ignition, and sustained arc damage during cathode heating. However, experimental testing has shown either inconclusive or minimal risk to cathode lifetime due to hundreds or thousands of heaterless ignitions. To demonstrate operation of MaSMi's LUC in the event of a heater failure, and to characterize the ignition behavior in preparation for possible future iterations of the cathode, a series of heaterless ignition trials were performed.

Heaterless ignition of MaSMi's LUC was achieved by supplying high propellant flow rates (~10× the rates required for normal operation) and sweeping $V_k$ from 0-1,500 V until a Paschen breakdown occurred. Because heaterless cathode ignition is a destructive process, the keeper current was limited to 150 mA in all trials but two (limited to 300 mA), to reduce orifice plate damage through a reduction in the power of the field emission between the keeper and orifice plate, while also preventing sufficient current between the two electrodes that would enable an explosive vacuum arc. The keeper-orifice plate field emission was allowed to heat the cathode until the insert reached thermionic emission temperatures, identified by a significant drop in the keeper voltage corresponding to facilitated electron emission by the low work-function emitter. Each ignition trial ended with the application of a 2 A discharge current to the downstream anode, followed by immediate removal of the keeper current and reduction of propellant flow to 0.20 mg/s to demonstrate normal cathode operation. A 1 kΩ resistor and a 180 µH inductor were installed in series with the positive side of the keeper supply to filter voltage spikes and limit the peak current during the ignition process.

Heaterless ignitions trials were performed with propellant flow rates of 2.0-3.9 mg/s in increments of 0.98 mg/s with a total of 10 ignitions at each flow rate. Each ignition was separated by 5 minutes to enable the insert to cool below thermionic ignition temperatures and each set of 10 ignitions was separated by ≥90 minutes to allow the cathode to cool to a "cold" condition.

Figure 4:
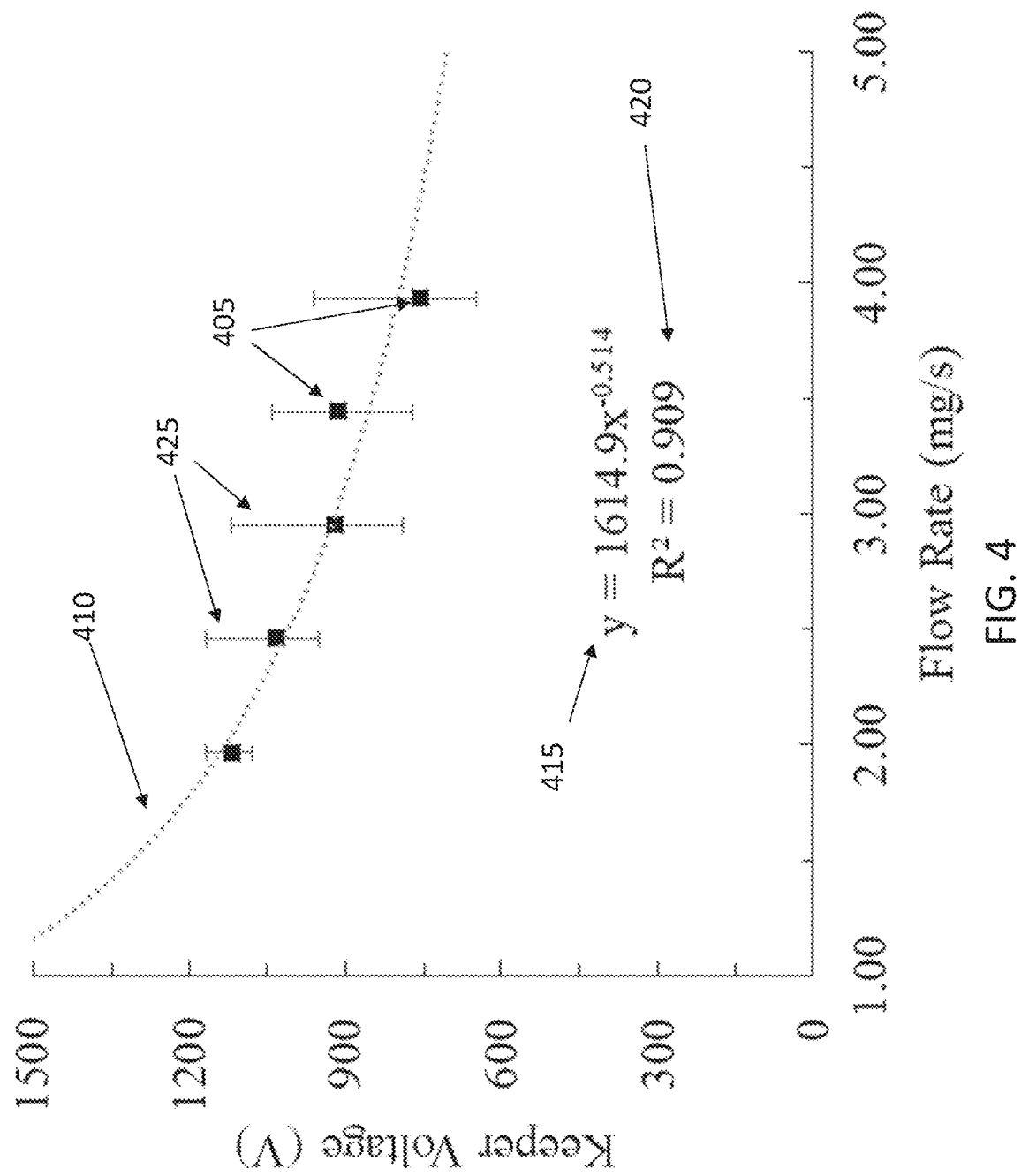
FIG. 4 illustrates an experimental dataset of keeper voltages at which field emission was established for the first-generation ultra-compact hollow cathode.

The keeper voltage at which the field emission was established between the keeper and orifice plate was recorded and is illustrated in FIG. 4. Each data point (405) in FIG. 4 represents the average of the 10 ignitions at the given flow rate. As expected, the average ignition voltage followed a trend characterized by a power law (via Paschen's Law). This trend line (410) is plotted in FIG. 4 along with its equation (415) and coefficient of determination or $R^2$ value (420). The error bars (425) represent the span of keeper voltages required to establish field emission, demonstrating the changes to, and variability in, surface morphology of the orifice plate due to repeated heaterless ignition processes.

The time for cathode ignition was recorded for the first of each set of 10 ignitions, representing the time to ignite the cathode from a cold condition. The keeper voltage immediately after ignition ranged from 140-310 V. For a keeper current of 150 mA, this corresponded to 21-47 W of power was incident on the cathode orifice plate upon initiation of field emission. This power steadily decayed until the insert reached thermionic emission temperatures, at which point $V_k$ dropped to between 31-95 V corresponding to an incident power of 5-14 W. The average heating time (i.e. time until cathode ignition after establishing field emission) was 82 s with a maximum time of 120 s (3.4 mg/s) and a minimum time of 55 s (2.9 mg/s). For comparison, ignitions from a cold condition at a keeper current of 300 mA were performed at 2.5 mg/s and 3.4 mg/s resulting in identical ignition times of 56 s. While the risk of vacuum arcs is greater at 300 mA than at 150 mA, the additional power transferred into the cathode via field emission netted a 26 s (32%) reduction in ignition time.

Anode propellant flow uniformity experiments were also conducted. Prior to measuring the MaSMi-DM's anode manifold flow uniformity, the flow response of the pitot probe was characterized. The relatively small pitot tube orifice and long tubing lengths limit the gas conductance to the pressure sensing filaments inside the ion gauge. An estimate of the time to affect a given change in pressure (tap) is obtained with standard vacuum conductances:

$$t_{\Delta P} = \frac{V_{gauge}}{S_{eff}} \log\left(\frac{P_o + \Delta P}{P_o}\right) \quad (4)$$

where $V_{gauge}$ is the internal volume of the ion gauge (including the pitot tube assembly), $S_{eff}$ is the effective conductance, d is the pitot tube inner diameter, L is the overall pitot tube length, and $P_o$ is the reference pressure. The internal volume of the ion gauge is estimated as 0.25 liter, and molecular flow is assumed due to Knudsen numbers of 10 to 100 for the pressure range $10^{-3}$-$10^{-2}$ Torr. Applying known quantities to Eq. (4) to find the time to observe a 10% change in pressure ($t_{10\%\Delta P}$) yields:

$$t_{10\%\Delta P} \approx \frac{V_{gauge}}{(121 \cdot d^3/L)} \log\left(\frac{P_o + \Delta P}{P_o}\right) = \quad (5)$$

$$\frac{0.25 \times 10^{-3} m^3}{121 \cdot (1.4 \times 10^{-3} m)^3 / 0.19 \, m} \log(1.1) = 6 \, s$$

Figure 5:
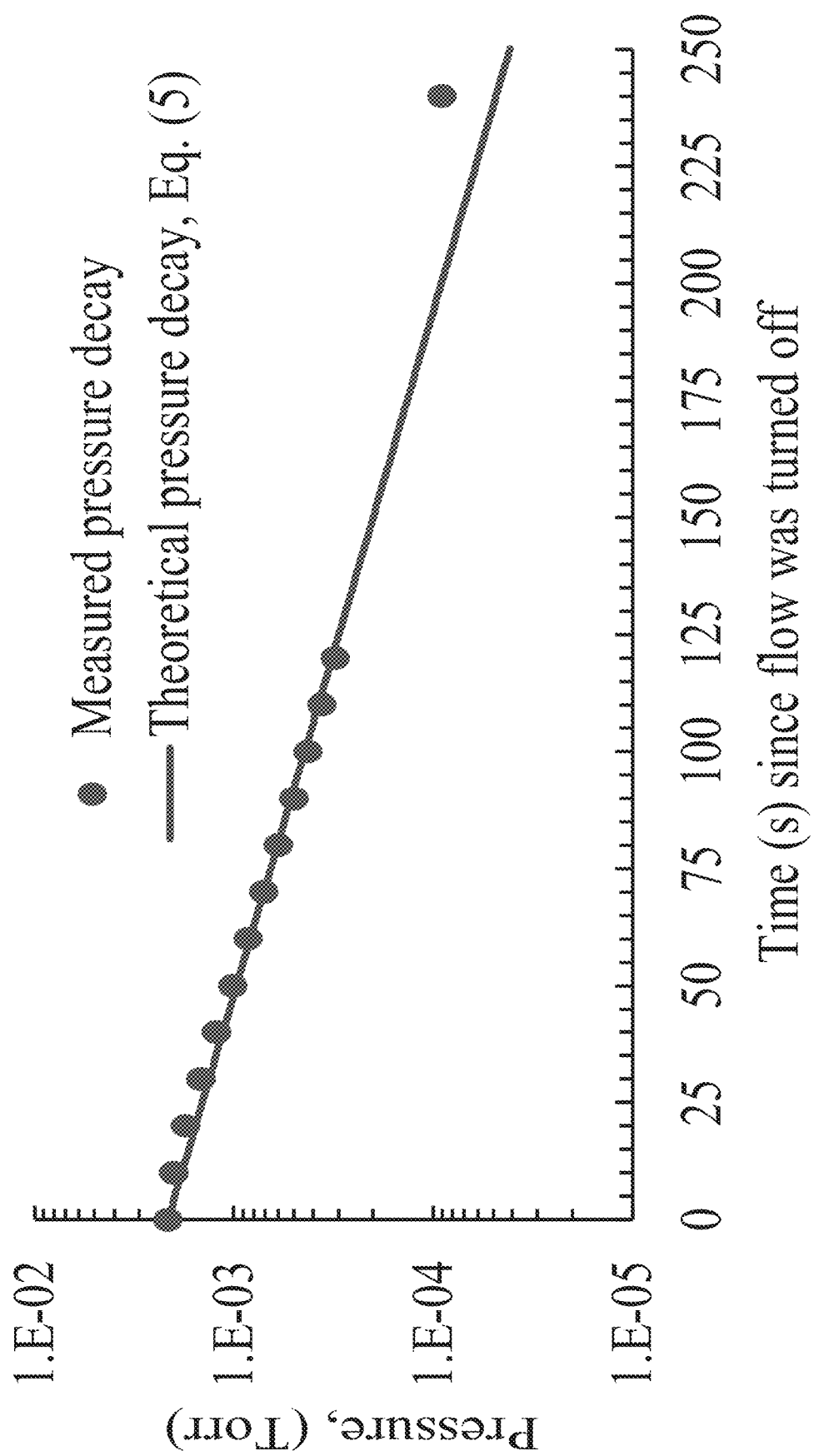
FIG. 5 illustrates the flow response by the pitot probe sensor when the gas flow is terminated at the feedthrough into the vacuum chamber.

The calculated settling time of 6 s was experimentally validated through a pressure versus time measurement, the results of which are illustrated in FIG. 5. The measured flow response also includes the time response of the flow through the propellant lines from the vacuum chamber wall to the anode manifold. Regardless, a 10% drop in local pressure inside the discharge channel was observed to occur within 13 s (larger due to the finite length propellant lines), thereby validating the estimate of 6 s. To guarantee accurate pressure measurements for this test, a 20 s settling time was used between consecutive measurements.

Figure 6:
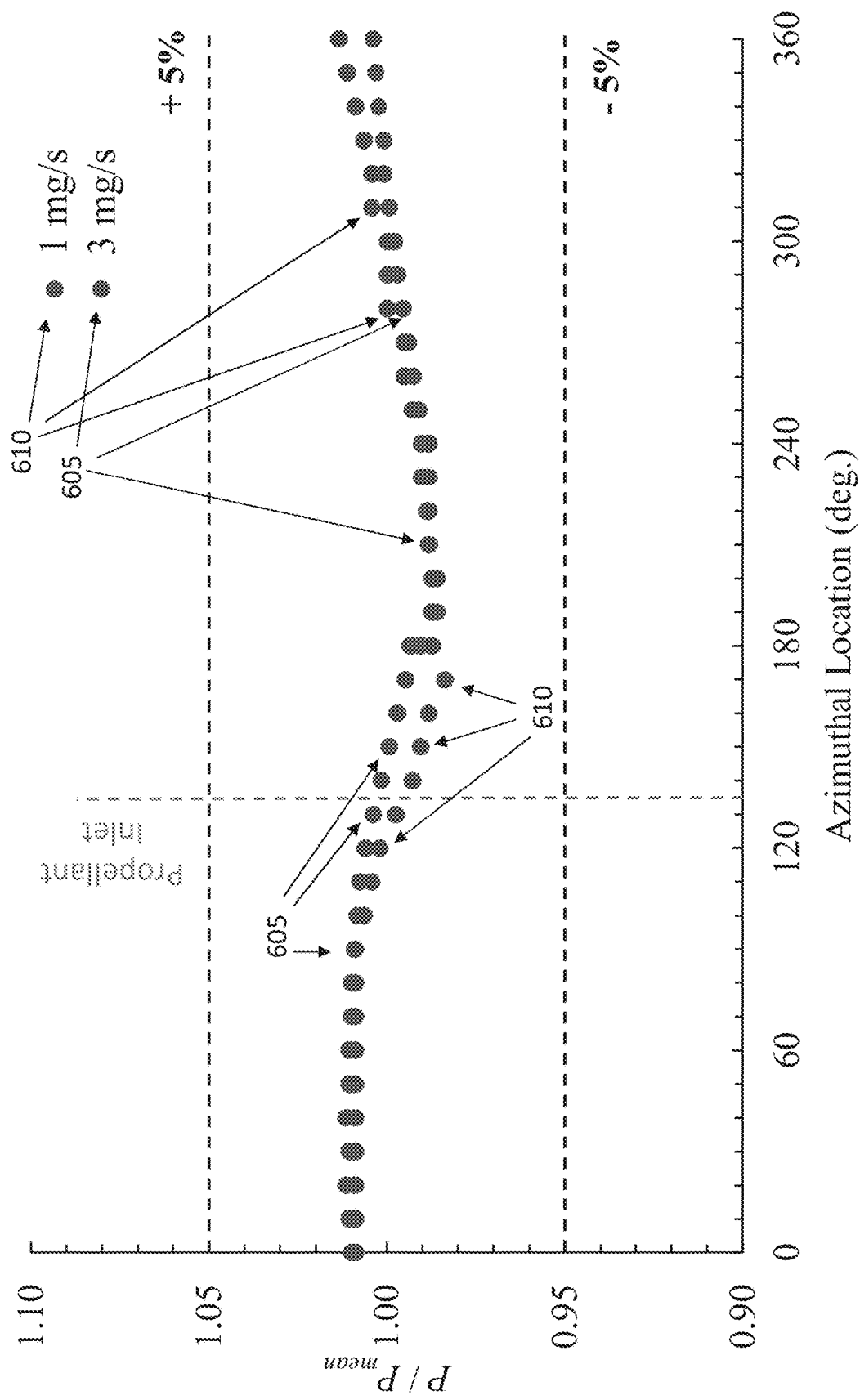
FIG. 6 illustrates data on the propellant flow uniformity for the anode.
Figure 7:
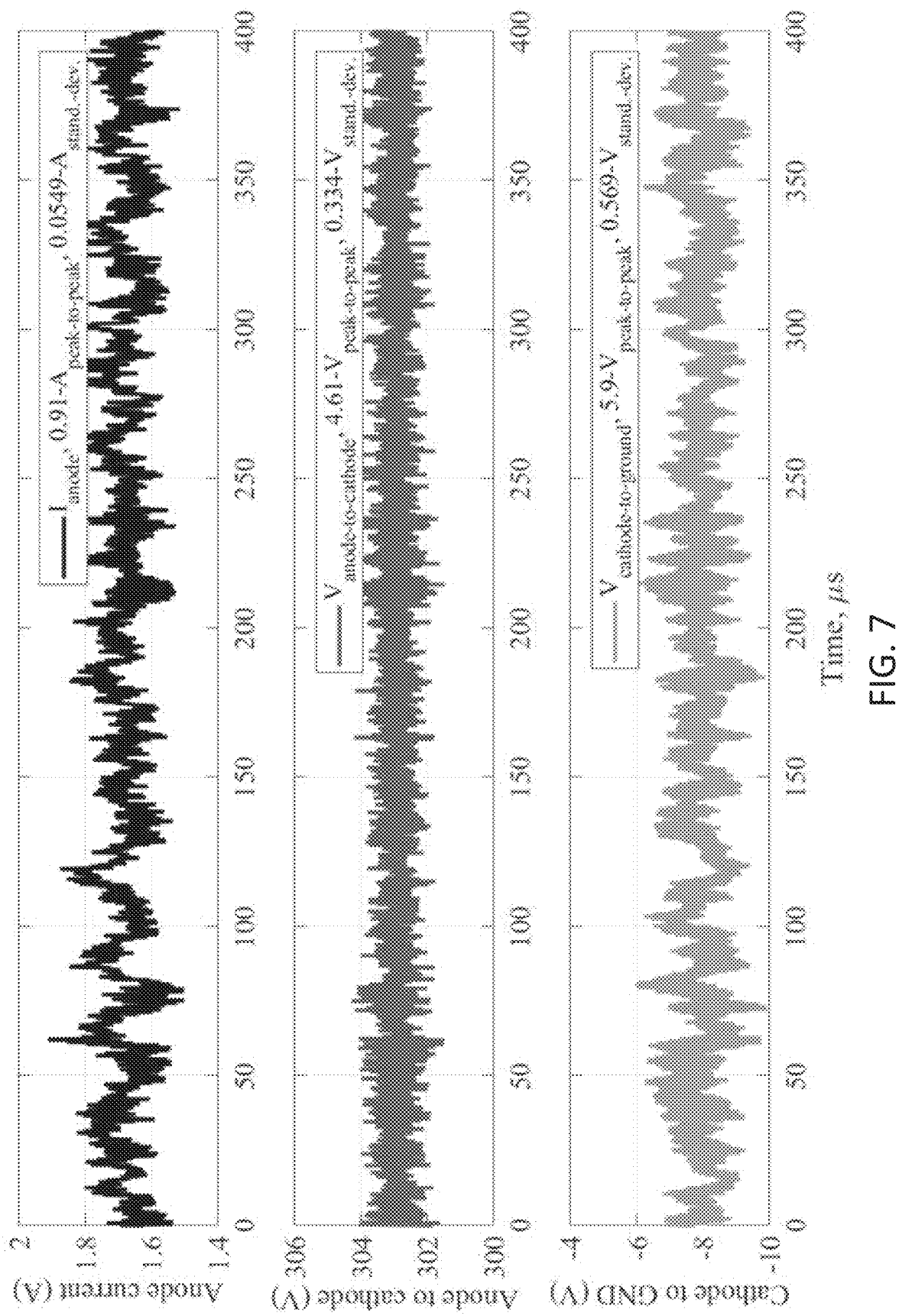
FIGS. 7-8 illustrate high speed telemetry.

The propellant flow uniformity for MaSMi-DM's anode was measured at 1 mg/s and 3 mg/s to approximately capture a "low-flow" and a "high-flow" condition. To ensure repeatability with the flow uniformity measurement, each azimuthal location was measured twice per flow rate (rotating the manifold ±360°). The results for the two flow conditions are illustrated in FIG. 6, where datapoints (605) are for a propellant flow rate of 3 mg/s, and datapoints (610) are for a rate of 1 mg/s. The flow uniformity demonstrated by the MaSMi-DM anode is well within the ≤10% variation requirement. Total peak-to-peak non-uniformity was 3.2% at 1 mg/s and 2.6% at 3 mg/s. The maximum non-uniformity, which was observed at the lower 1 mg/sec flow rate, was only 1.6% below the mean value. Based on these results, the MaSMi-DM anode flow uniformity is well below that measured in other high efficiency Hall thrusters.

Thruster performance was also tested. In particular, testing of the MaSMi-DM has consisted of three hot-fire sessions totaling less than 10 h of operation time and including a bake-out procedure and initial performance mapping. During all thruster firings, the magnetic field was set to what was judged to be near the nominal setting; future testing will confirm or modify this value. The thruster was operated in a cathode-tied electrical configuration i.e. the thruster body was electrically tied to cathode common. The cathode, in this experiment, was operated without any applied keeper current and with a cathode flow fraction (defined as the cathode flow rate divided by the anode flow rate, $\dot{m}_c/\dot{m}_a$) of between 2-7%.

Thruster bake-out was performed at a discharge voltage of 300 V while the power was slowly increased from ~300 W to ~550 W in steps of ~50 W until thermal steady state was approached. At each step, the discharge power was observed to rise (heating-related outgassing), fall (reduced outgassing), and then stabilize before advancing to the next power level. The thruster was assumed to approach thermal steady state when the thruster temperatures were changing by ≤10° C./h and the discharge current at a given discharge voltage and flow rate varied by ≤±0.025 A/h. The maximum temperatures observed that met the aforementioned near-steady state conditions were 286° C., 233° C., and 337° C. on the back pole, front outer pole, and inner coil, respectively. Reaching these temperatures took <3 h from the thruster's initial temperature of ~15° C. No performance data was recorded during the bake-out.

During the early stages of performance mapping, several failures occurred in the ground support equipment (GSE) for the vacuum facility which prevented a thorough characterization of the thruster. However, some noteworthy data were recorded during the initial hours of thruster operation. Prior to the GSE failure and with the discharge voltage maintained at 300 V, the discharge power (Pd) was varied from 300-550 W at the assumed nominal magnetic field setting. Peak performance was measured at 500 W with a thrust (T) of 34.3 mN, an anode efficiency ($\eta_a$) of 45%, a total efficiency ($\eta_t$) of 41%, and an anode and total specific impulse ($I_{sp,a}$, $I_{sp,t}$) of 1370 s and 1320 s, respectively, according to the following equations:

$$\eta_a = \frac{T^2}{2\dot{m}_a P_d} \quad \eta_t = \frac{T^2}{2\dot{m}_t P_t} \quad (6)$$

$$I_{sp,a} = \frac{T}{\dot{m}_a g} \quad I_{sp,t} = \frac{T}{\dot{m}_t g} \quad (7)$$

where $\dot{m}_a$ is the anode propellant mass flow rate, $\dot{m}_t$ is the total propellant mass flow rate, $P_t$ is the total thruster power (discharge, keeper, magnet, etc.), and g is Earth's gravitational acceleration. Several other operating points resulted in total efficiencies of ~40% (anode efficiencies >42%) and specific impulses of >1,400 s. These performance data, which were taken at non-optimized thruster operating points for the MaSMi-DM, show good agreement with the performance predicted by Hall2De as presented in the present disclosure. Furthermore, they indicate a ≥25% increase in total and anode efficiency compared with the previous generation MaSMi-60-LM2 which demonstrated 32% total efficiency and 39% anode efficiency.

Figure 15:
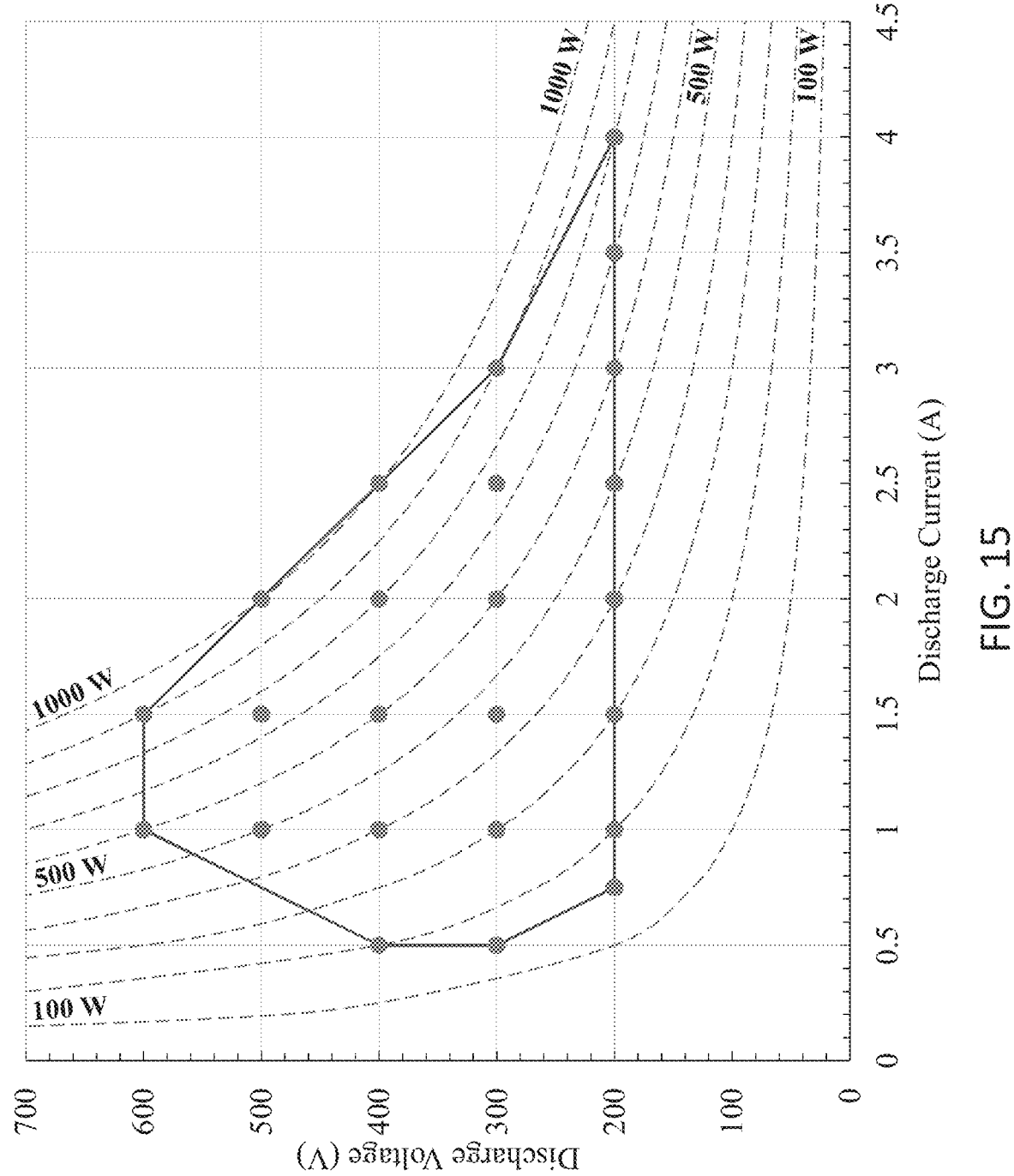
FIG. 15 illustrates the operation envelope for the MaSMi-DM performance characterization.

During further testing, the thruster accrued 100.1 h of operating time and processed 0.92 kg Xe. MaSMi's LUC demonstrated 102 heaterless ignitions with no observable changes to ignition time, stability, etc. The MaSMi-DM was operated over a discharge voltage range of 200-600 V in increments of 100 V, a discharge current range of 0.5-4 A in increments of 0.5 A, and a discharge power range of 150-1000 W. At discharge voltages beyond 400 V, the minimum discharge current was increased to 1 A. A summary plot of the operating points examined is presented in FIG. 15. At each current-voltage (I-V) condition, the magnetic field (B) was swept from the minimum to the maximum setting, spanning ±40% from the median setting, to identify the peak performance point (i.e. highest total efficiency) as well as any unfavorable operating regimes. Testing was performed at constant discharge current; as such, the propellant flow rate was adjusted as necessary as the magnetic field setting was changed. The results presented in the following sections are based on the performance recorded at the peak performance point of each I-V-B trace.

Figure 16:
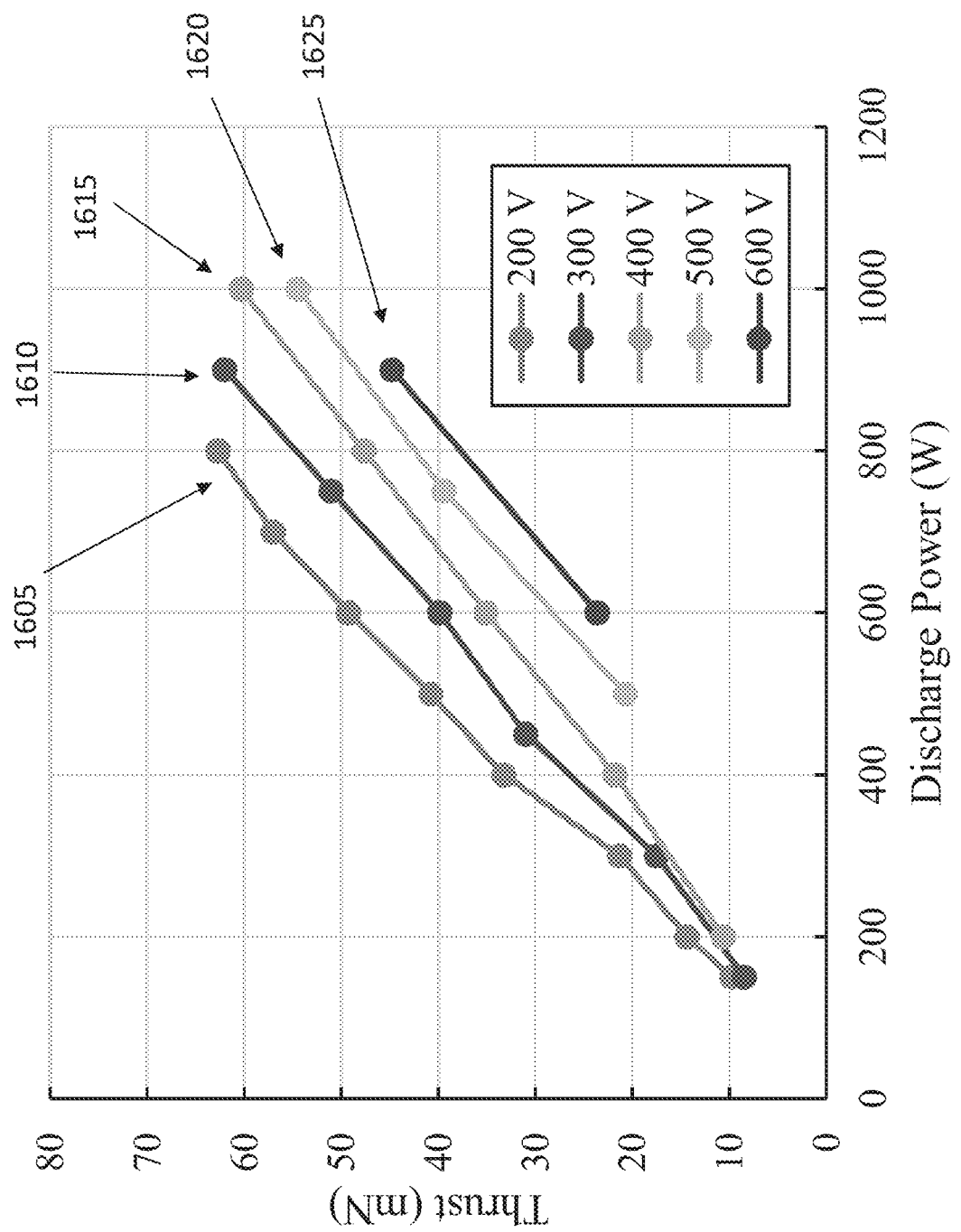
FIG. 16 illustrates MaSMi-DM thrust vs. discharge power.

Thrust at each discharge voltage as a function of discharge power is illustrated in FIG. 16. The thrust curves are highly linear with increases the discharge power yielding proportional increases in thrust. A peak thrust of 62.7 mN at 200 V and 800 W was recorded, which was limited by the discharge current limits set for the campaign; thrusts of >70 mN at 200 V & 1000 W appear possible should that condition be advantageous in future mission planning. A slight deviation from linearity was observed in the 200 V thrust curve at 300 W, where the measured thrust dipped slightly (note that this behavior is consistent with the MaSMi-60-LM1)[25]. This was a repeatable behavior not observed at other power conditions. FIG. 16 illustrates data for 200 V (1605), 300 V (1610), 400 V (1615), 500 V (1620), and 600 V (1625).

Figure 24:
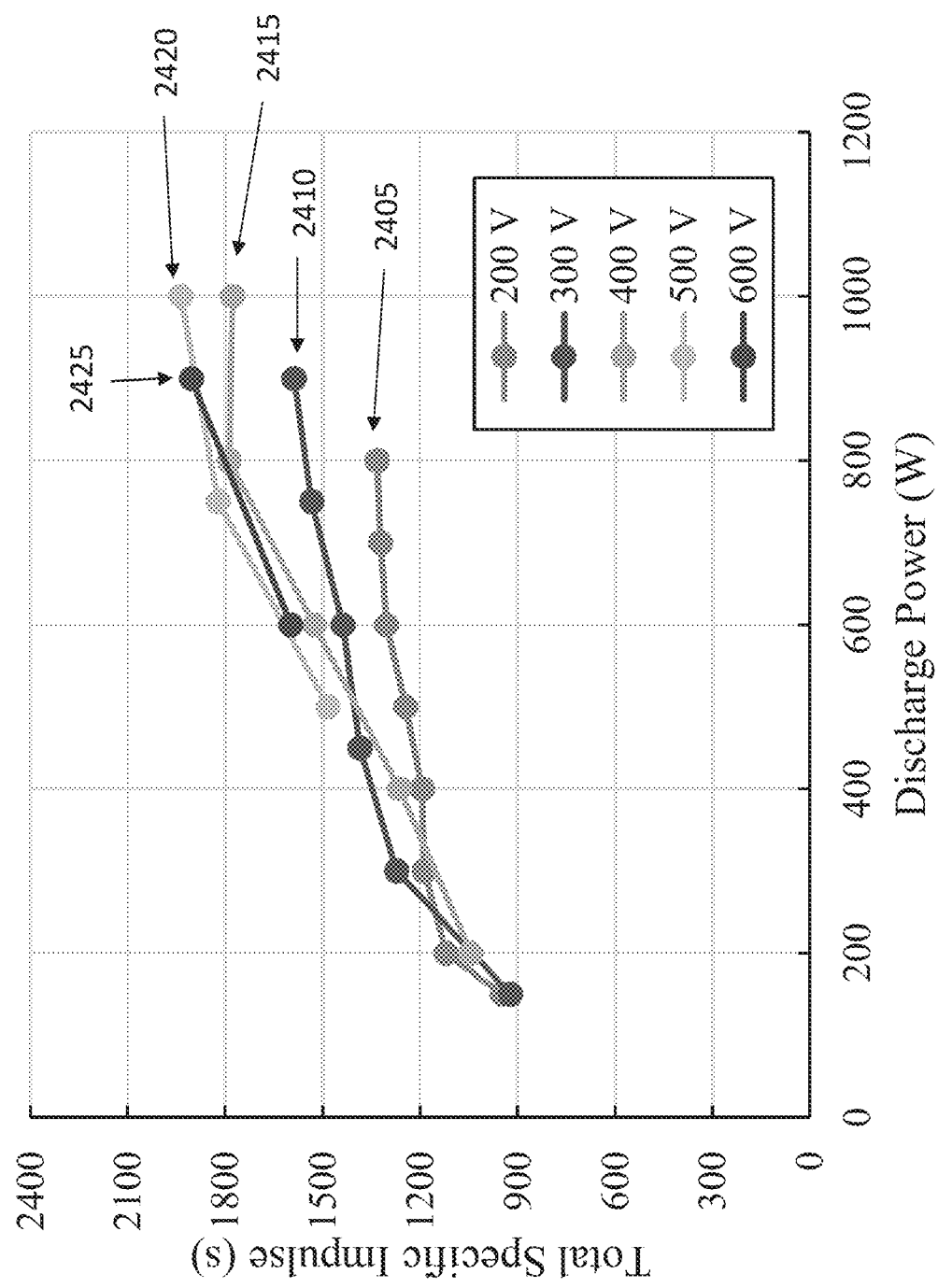
FIG. 24 illustrates MaSMi-DM total specific impulse vs. discharge power.

Total specific impulse at each discharge voltage as a function of discharge power is illustrated in FIG. 24. Higher discharge voltages yielded higher $I_{sp}$ once a sufficiently high current density was achieved, which corresponded to between 1-1.5 A of discharge current. A peak $I_{sp}$ of 1940 s was recorded at 500 V and 1000 W, and 1500 s was achievable at multiple discharge voltages beyond 500 W. FIG. 24 illustrates data for 200 V (2405), 300 V (2410), 400 V (2415), 500 V (2420), and 600 V (2425).

Figure 25:
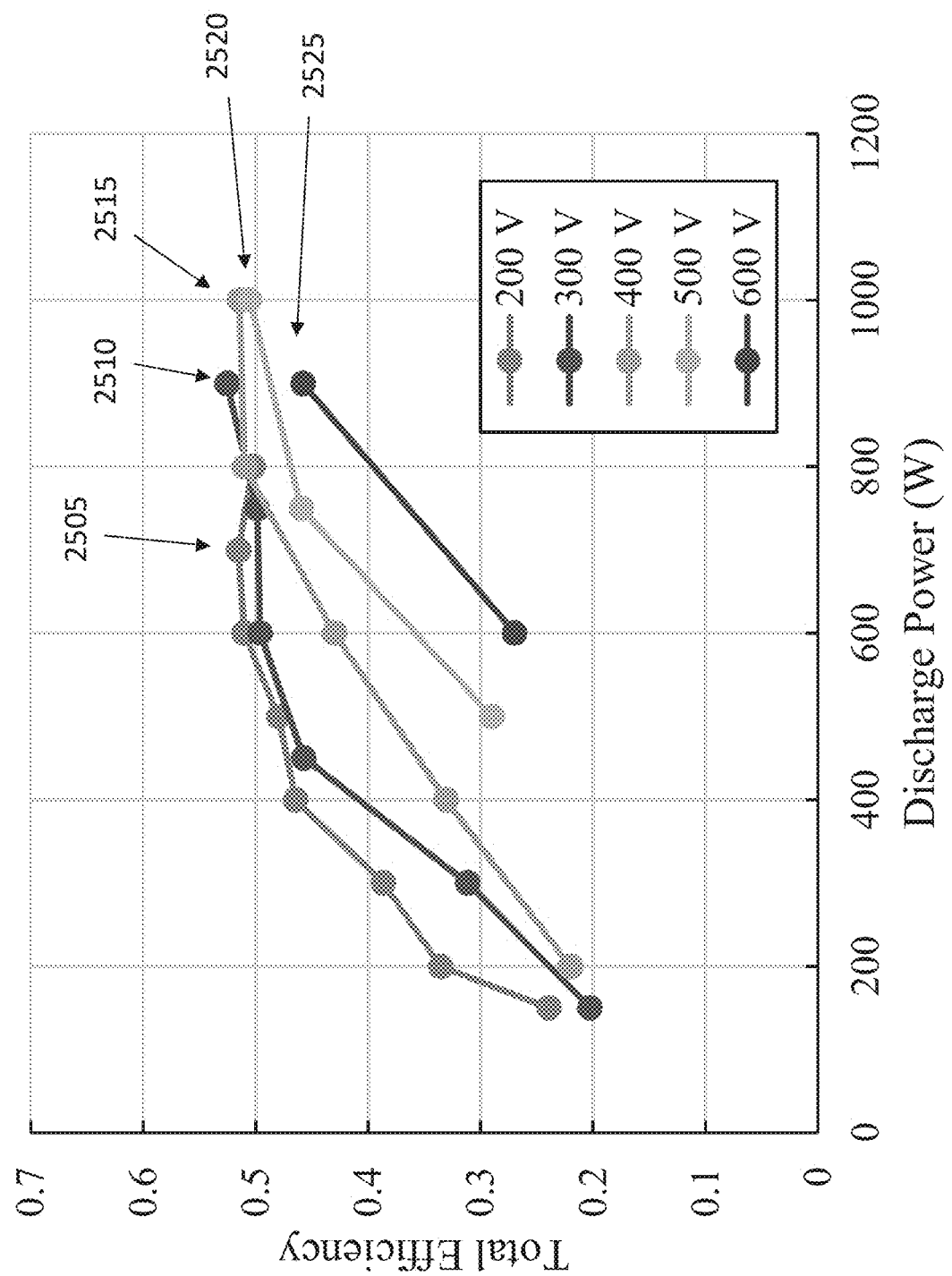
FIG. 25 illustrates MaSMi-DM total efficiency vs. discharge power.

Total thrust efficiency at each discharge voltage as a function of discharge power is presented in FIG. 25. Thruster efficiency steadily increased with discharge current (tied to current density) until ~1.5 A where each curve began to plateau. The MaSMi-DM demonstrated a peak total efficiency of 53% with efficiencies of ≥40% available as low as ~300 W. It can be noted that the Hall2De thrust, anode $I_{sp}$, and anode efficiency predictions of 31.5 mN, 1590 s, and 48% at 300 V and 500 W matched well with the measured values of 33.9 mN, 1500 s, and 50% (determined by linear interpolation between the 450 W and 600 W cases at 300 V). FIG. 25 illustrates data for 200 V (2505), 300 V (2510), 400 V (2515), 500 V (2520), and 600 V (2525).

Figure 26:
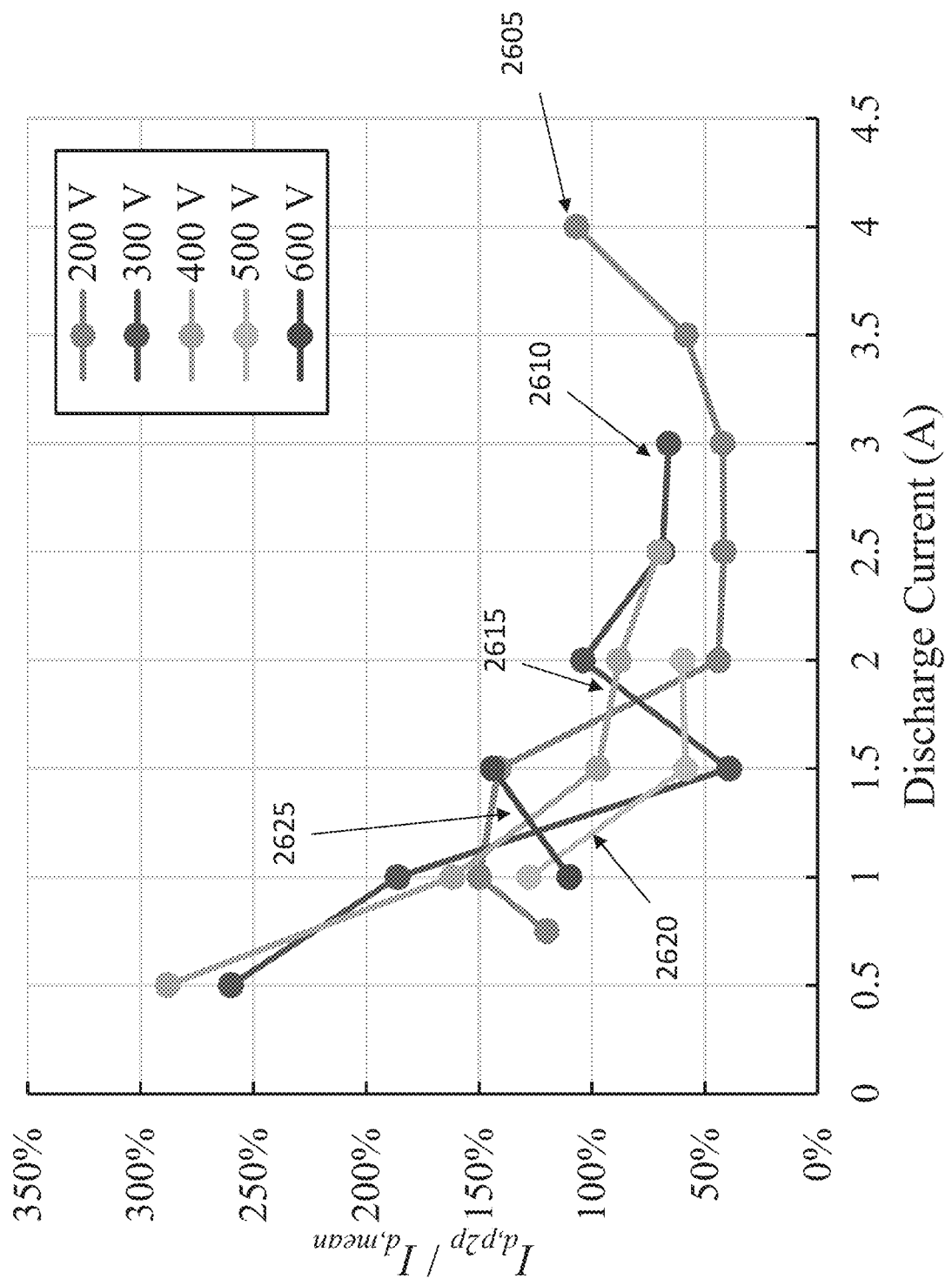
FIG. 26 illustrates MaSMi-DM discharge current oscillations (ratio of peak-to-peak current to mean current) vs. discharge current.

A summary of the discharge current oscillations, presented as a ratio of the peak-to-peak discharge current oscillations ($I_{d,p2p}$) to the mean discharge current ($I_{d,mean}$) at each discharge voltage, as a function of discharge current is shown in FIG. 26. In every case, peak-to-peak oscillations dropped to ≤100% of the mean current beyond 1.5 A od discharge current. Oscillations remained ≤150% of the mean current for all conditions except for four, occurring at 300 V and 400 V and ≤1 A of discharge current. FIG. 26 illustrates data for 200 V (2605), 300 V (2610), 400 V (2615), 500 V (2620), and 600 V (2625).

Analysis of the plasma near the discharge channel revealed magnetic shielding in the thruster. Dark zones were observed between the high density plasma, near the thruster exit plane, and the discharge channel surfaces. These dark zones are associated with low local electron temperatures near the channel walls. The low electron temperatures along the channel walls, corresponding to low local xenon excitation rates near the channel surfaces, is a visual indication of a magnetically shielding Hall thruster field topology. Furthermore, the discharge channel, after the thruster's operation, was found coated in a layer of back-sputtered graphite free of any white zones (BN cleaned of carbon back-sputter by xenon ion-bombardment). Blackened channel walls are a necessary feature, but not a sufficient condition, for magnetic shielding to exist. Previous MaSMi testing measured carbon backsputter rates of 0.03-0.06 μm/h at a discharge voltage of 300 V, corresponding to discharge channel erosion rates of 0.06-1.13 μm/h. However, higher backsputter rates were expected due to the proximity of the plasma diagnostics rig. Nevertheless, the combination of Hall2De plasma simulations (constant predicted plasma potential along the channel, low predicted wall electron temperature, and low predicted erosion), dark zones local to the channel walls during thruster operation, and carbon-coated channel walls after operation indicates that the MaSMi-DM generates a fully shielding magnetic field topology.

Figure 8:
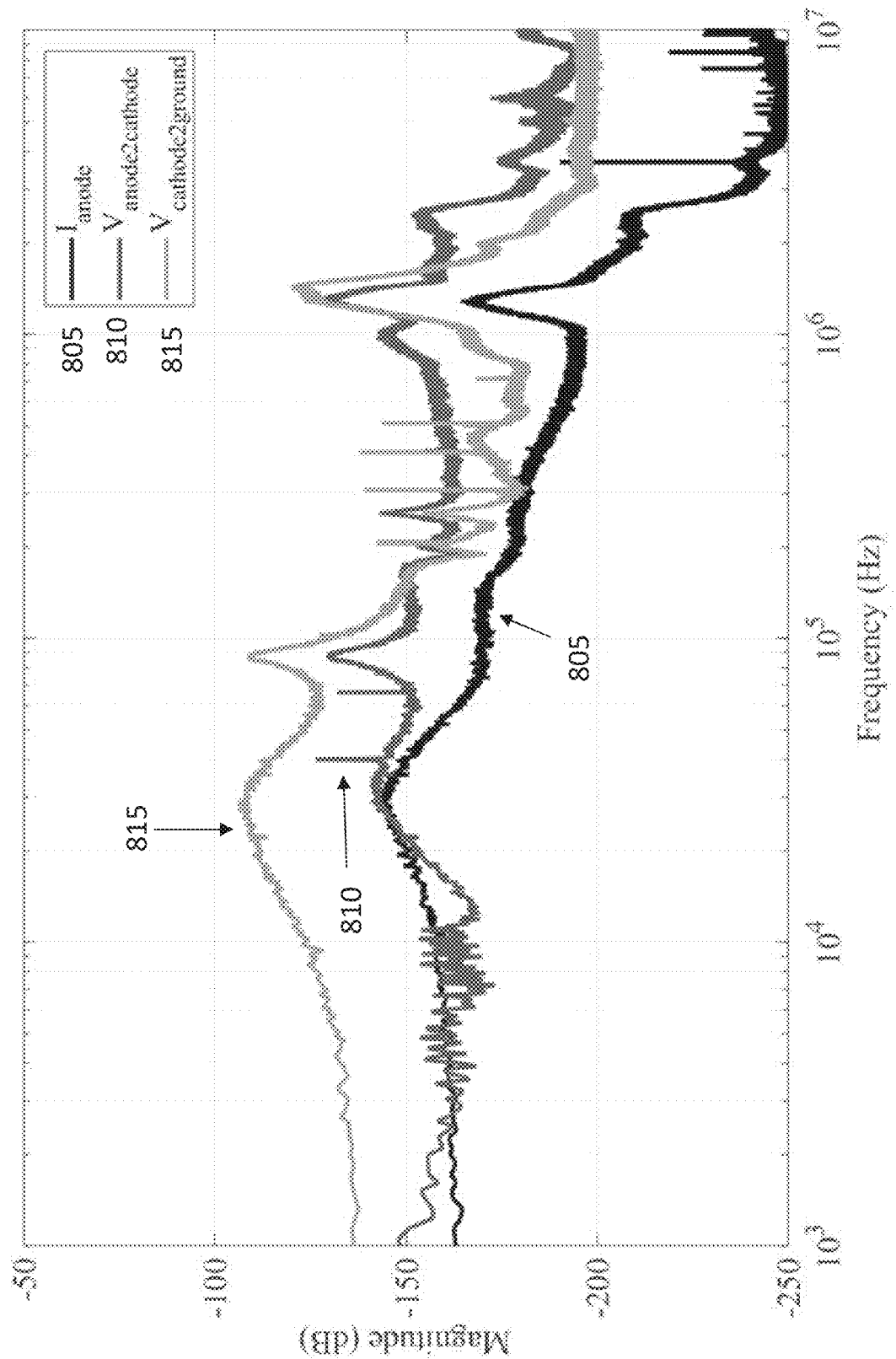

Typical high speed telemetry collected during operation of the MaSMi-DM are illustrated in FIG. 8, where both the time series and power spectral density (PSD) data are presented for the thruster operating at 300 V and 500 W. Scope data were collected for 0.5 seconds at each condition to provide sufficient statistical accuracy for the various unsteady and turbulent plasma modes. The anode current generally showed breathing mode oscillations with frequencies between 20-50 kHz. Over the 0.5 s sample interval, the peak-to-peak was consistently on the order of 50-300% of the mean current while the standard deviation remained <10% of the mean current at most of the operation points. It should be noted that the values in the legend of FIG. 8 are based on the full 0.5-s dataset and therefore hold statistical significance. The discharge voltage showed up to <2% voltage spikes that were correlated to the turbulent breathing mode oscillations. The cathode-to-ground voltage followed the anode potential and discharge current oscillations with a peak-to-peak voltage of ~0.6 V. The PSDs of these three signals clearly show the Hall thruster breathing mode centered at 28 kHz (other conditions showed stronger and more coherent breathing mode oscillations). Several higher frequency features at 87 kHz and at 1.3 MHz were also observed that may include cathode modes based on prior studies with magnetically shielded Hall thrusters. While this condition shows the 1.3 MHz mode in all three signals (anode current, anode-to-cathode voltage, and cathode-to-ground voltage), other conditions (not shown) retain this 1.3 MHz mode only in the cathode signals. Since anode current oscillations were not observed at 87 kHz and appeared at 1.3 MHz only at certain operation conditions, these two features could be cathode specific or azimuthally rotating spokes.

A development model version of the low-power magnetically shielded MaSMi Hall thruster with an internally-mounted ultra-compact hollow cathode (MaSMi's LUC) was designed, fabricated, and subjected to component and initial performance testing. In addition to the novel internally-mounted hollow cathode, the MaSMi-DM incorporates an improved gas distributor and magnet coil design, yielding uniform propellant flow through the discharge channel and low required magnet powers, respectively. A barium-depletion life model for MaSMi's LUC design suggested an operational lifetime of >36 kh, which provides margin against the thruster lifetime goal of >10 kh. Plasma simulations of the MaSMi-DM predicted strong performance, with near 50% anode efficiencies and near 1,600 s specific impulse at 500 W of discharge power.

Independent characterization testing of the cathode revealed flat discharge voltage versus discharge current behavior across the range of expected operating flow rates and thruster discharge currents. Furthermore, a series of heaterless cathode ignition trials were performed to demonstrate the capability and to provide an initial indication of the system requirements to ignite MaSMi's LUC in the event of a cathode heater failure. While integrated cathode/thruster testing was limited by facility failures, several performance data points were recorded at non-optimized thruster operating conditions. Total efficiencies of ~40% (anode efficiencies of >42%) and specific impulses of >1,400 s were calculated from thrust measurements, with a peak total efficiency of 41% corresponding to a peak anode efficiency of 45%. This represents a ≥25% performance improvement over the previous generation MaSMi-60-LM2 and indicates that further increases in performance are possible after optimizing the thruster operating points.

Figure 9:
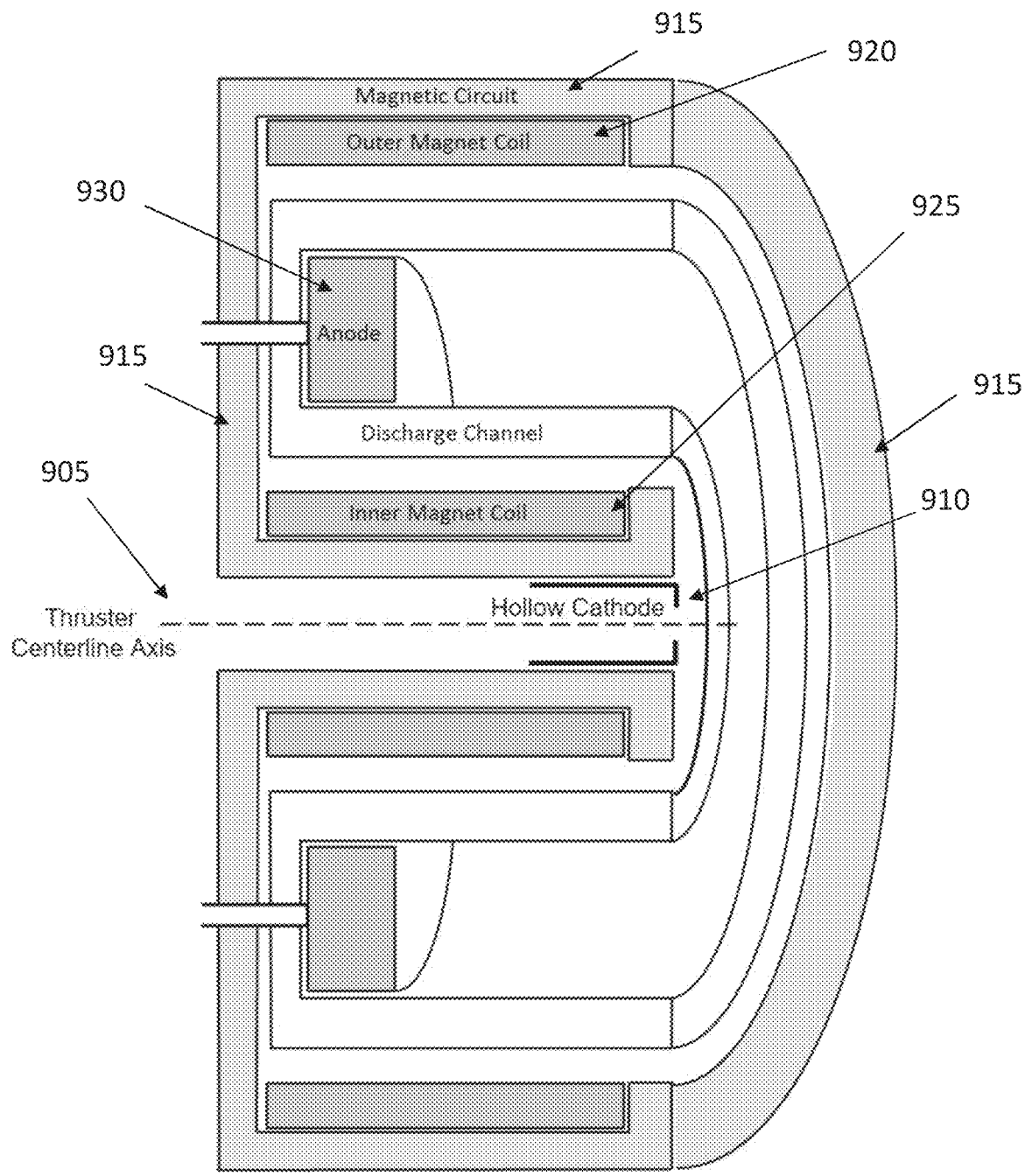
FIG. 9 illustrates an exemplary Hall thruster diagram.

A cross-section, in perspective view, of the low-power MS Hall thruster and ultra-compact low-current hollow cathode described in the present disclosure is illustrated in FIG. 9. The key design features that enable this technology's implementation are the thruster's inner core design, which has sufficient magnetic material along the thruster axis to support the magnetic flux necessary to produce a distortion-free MS field topology, as well as the axially-short ultra-compact cathode, which enables internal mounting while reducing the geometric impact on the thruster's magnetic circuit. In some embodiments, the axial length of the thruster in FIG. 9 is about 10 cm. FIG. 9 illustrates the MaSMi-DM low-power Hall thruster with a heater-based ultra-compact low-current hollow cathode mounted internally and along the thruster's centerline. FIG. 9 illustrates an exemplary cross-section of a Hall thruster with the internally mounted hollow cathode and discharge channel highlighted. A more detailed outline of the thruster is illustrated in the following figures. In FIG. 9, the thruster's centerline axis (905) is illustrated. The thruster has azimuthal symmetry around this axis, as can be understood from FIG. 9. FIG. 9 illustrates the hollow cathode (910). In some embodiments, a coil heater as described below is placed at the location of hollow cathode. A cathode propellant tube can be placed along the centerline axis, taking advantage of the hollow volume in the center of the thruster. FIG. 9 illustrates the magnetic circuit (915), the outer magnet coil (920), the inner magnet coil (925), and the anode (930); all these elements, as well as the cathode, have azimuthal symmetry around the centerline axis.

Traditionally, flight and flight-like hollow cathodes have used a continuous diameter along their full axial length to facilitate fabrication and provide sufficient thermal isolation from the mounting flange on the back of the thruster. In higher-power thrusters using an internally-mounted cathode, the entire cathode assembly is mounted along the thruster centerline requiring a large center bore to be made along the centerline of the thruster's inner core. This moves the thruster's magnetic circuit components radially outward, to maintain sufficient magnetic material along the thruster's inner core to avoid saturation, a condition which can distort the magnetic field topology and compromise the thruster's operation and performance. As a result of the large diameter components with an internally-mounted cathode, the thruster is driven to a higher nominal power.

The thruster described in the present disclosure uses an inner core with an axially varying diameter. The upstream section is the larger in diameter to support high magnetic flux and force any saturation effects further downstream, thereby giving the maximum cross-channel field strength possible. The ultra-compact cathode design, illustrated in FIG. 10, only requires a larger bore near the downstream end of the thruster's inner core, as seen in FIG. 9 (915), FIG. 10 (1005), and FIG. 11 (1105). Therefore, the remaining part of the inner core can be bored with a smaller diameter (1110) to accommodate the cathode propellant delivery line. Unlike conventional internally-mounted cathodes, the propellant and electrical lines of the ultra-compact cathode can be routed along and/or parallel to the thruster axis using small diameter holes (1115) along the thruster length. This enables the cross-sectional area of the center core to be maximized in the space available, given the constraints of the remaining thruster geometry, thereby preventing significant impact to the thruster's magnetic circuit and minimizing the diameter of the thruster's discharge channel (i.e. minimizing the nominal operating power).

Figure 11:
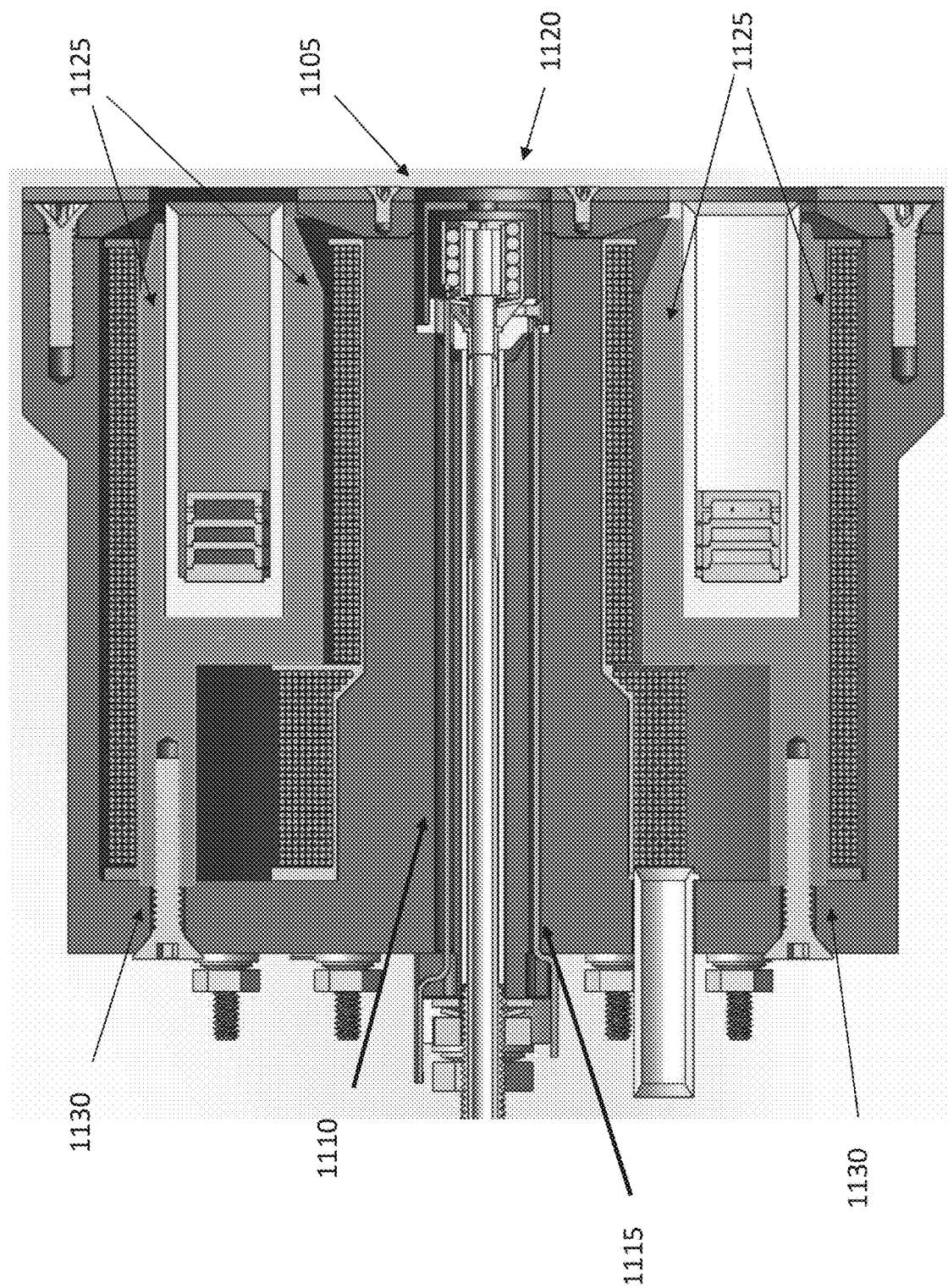
FIG. 11 illustrates an exemplary Hall thruster highlighting the one-piece magnetic screen.

Additionally, the cathode tube is designed to be only as long as the barium oxide-impregnated tungsten (BaO—W) or lanthanum-hexaboride ($LaB_6$) thermionic electron emitter, with the outer diameter of the cathode tube determined by the lifetime requirement of the emitter. The baseline design shown in FIG. 11 is capable of >10 kh. Because a short axial length is a driving feature of the new cathode design, only the portion of the cathode tube housing the emitter is larger in diameter than the propellant line. This allows the cathode tube to accept a larger volume emitter (i.e. longer life) in a shorter axial distance, compared to conventional designs that use the same diameter tube for both the cathode tube and propellant line.

Figure 10:
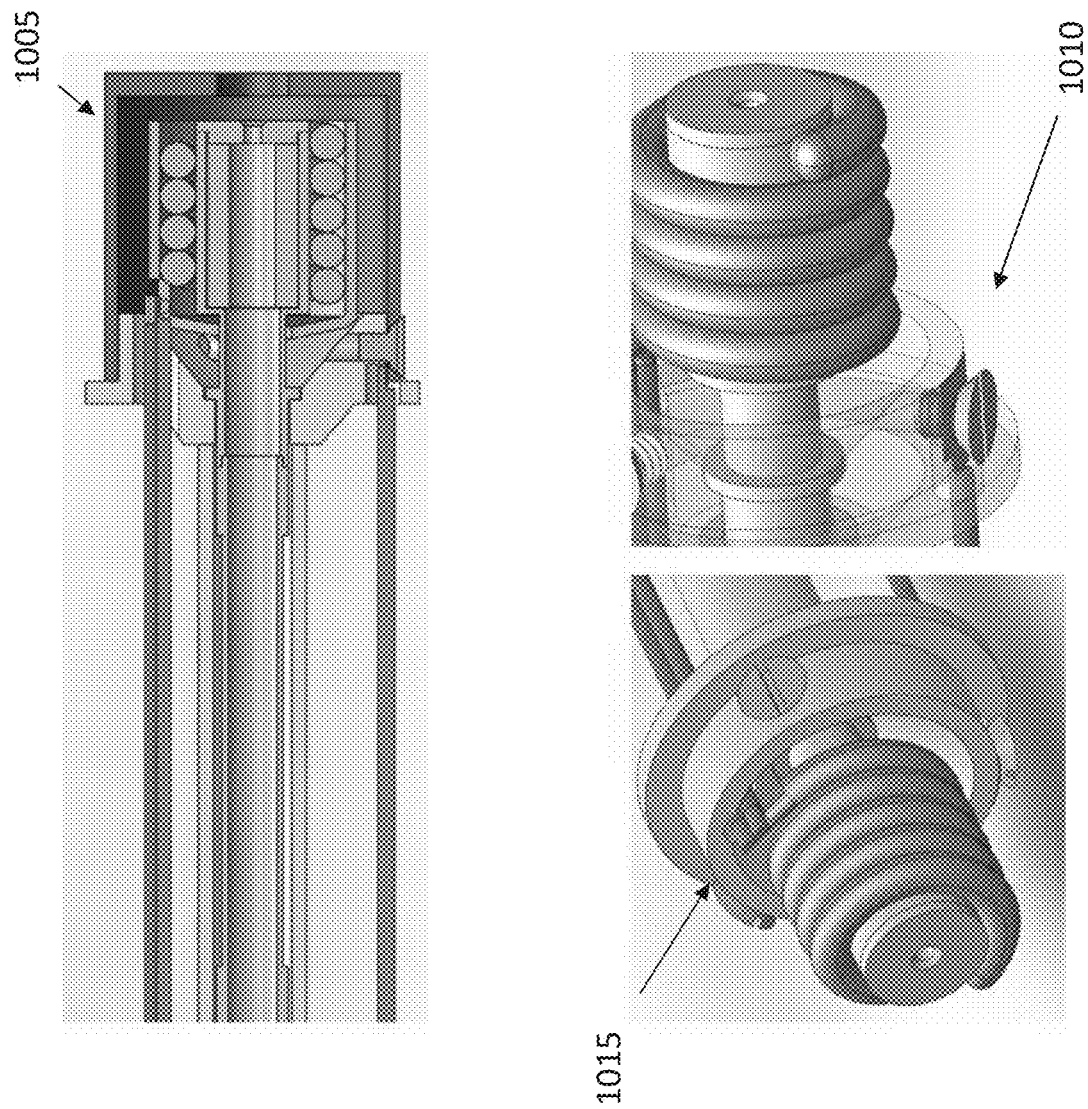
FIG. 10 illustrates an exemplary ultra-compact cathode heater.

Sufficient thermal isolation of the cathode, providing an efficient plasma discharge with low power losses from the electron emitter, was achieved by thinning the walls of specific areas of the cathode tube and propellant line to create thermal chokes. By reducing the cross-sectional area of the cathode tube and propellant line perpendicular to the direction of heat flow, the ability of the tube to thermally conduct heat away from the thermionic insert is minimized. FIG. 10 illustrates different views of an ultra-compact low-current hollow cathode with a swaged coil heater. Some electrical connections are also illustrated (1015, 1010). The position of the coil heater within the thruster is illustrated also in FIG. 11 (1120).

Two cathode heating and ignition technologies can be applied within the small dimensions of the ultra-compact cathode: high voltage breakdown and swaged coil resistive heaters. High voltage breakdown-type cathodes, also known as "heaterless" cathodes, use a Paschen breakdown mechanism, between the cathode orifice plate and the external keeper electrode, to strike the cathode discharge. The Paschen breakdown mechanism comprises a low current electrical arc traveling through a gaseous medium with high local pressure. These cathodes have very small form factors due to the lack of a dedicated electrical heater, but have a slightly more complicated start-up procedure compared to other cathodes. Lifetimes of heaterless cathodes using a tungsten orifice plate over the thermionic emitter have been shown to be of the same order as those of cathodes using heaters, with tens of thousands of starts demonstrated in laboratory environments.

Alternative cathodes are swaged coil heater cathodes, which use a resistive heating element coiled around the cathode tube (as illustrated in FIG. 10) to heat the thermionic emitter to the ignition threshold, and allow striking of the discharge. The number of cathode starts possible with coil heaters is determined by the robustness of the heater. Swaged heaters have demonstrated thousands of starts and continuous operating times greater than 10 kh.

Both heater-based and heaterless ultra-compact low-current cathodes have been demonstrated with the MaSMi-DM thruster. Both high voltage breakdown and swaged coil heater cathode designs provide a long-life, multi-start operation. To date, Hall thrusters using an internally-mounted cathode operate at high-power (>1.5 kW) using axially long, large-diameter cathodes. To date, no Hall thruster with an internally mounted cathode has been flown. The Hall thruster magnetic circuit design of the present disclosure can accommodate an ultra-compact low-current cathode and is an innovative architecture that enables the improvements to performance, operational stability, and ion beam symmetry demonstrated by high power thrusters using internally mounted cathodes.

With regard to thermal choking, discussed above with reference to thermal conduction within the thruster, it is known to the person of ordinary skill in the art that cathodes use thermionic emitters, which must be raised to a specific threshold temperature (material dependent) to emit electrons and allow the cathode to function. Ideal steady-state operation of a cathode requires no external sources of power to add heat to the emitter and maintain a cathode discharge. Resistive heating caused by the electron-rich plasma exiting the cathode orifice is sufficient to keep the emitter hot enough for stable operation; this is known as cathode self-heating. If the emitter becomes too cold to maintain the cathode discharge (e.g. the discharge is not drawing sufficient current to maintain cathode self-heating), the cathode discharge will become unstable and eventually extinguish. An electric current may be drawn to the cathode keeper to enable operation at lower-than-nominal discharge currents (i.e. effectively pulling extra current through the cathode to the keeper and thereby elevating the cathode emitter temperature). However, this process comes at the expense of electrical efficiency; power is being used for the keeper and not directly contributing to the production of thrust.

To enable cathode operation at low discharge currents, cathode design features must be implemented to keep the thermionic emitter hot enough for electron production. One key method is attaining a high level of thermal isolation of the cathode emitter by use of low thermal conduction materials in the cathode. By preventing conductive heat transfer upstream along the cathode tube, the cathode emitter maintains higher temperatures at lower discharge currents.

Magnetic shielding is a unique field topology achieved through careful design of the thruster's magnetic circuit. Magnetic hollow cylinders, called "screens", are located radially inward and outward of the discharge channel walls. These screens are magnetically coupled to the thruster's magnetic circuit and are important for producing a MS field topology. As these screens are extended towards the exit plane, a significant fraction of the magnetic flux emanating from the pole pieces, and crossing the discharge channel gap, is shunted through the screens, forcing the local curvature of the magnetic field. This local curvature causes the field lines, that leave one pole piece and cross the channel gap, to turn upstream, towards the anode, before turning downstream and reconnecting to the opposite pole piece. A more detailed explanation of the unique features of an MS field topology and the plasma physics describing the benefits to thruster lifetime and performance is known to the person of ordinary skill in the art, with certain features described in U.S. Pat. No. 9,453,502, the disclosure of which is incorporated herein by reference in its entirety.

Figure 12:
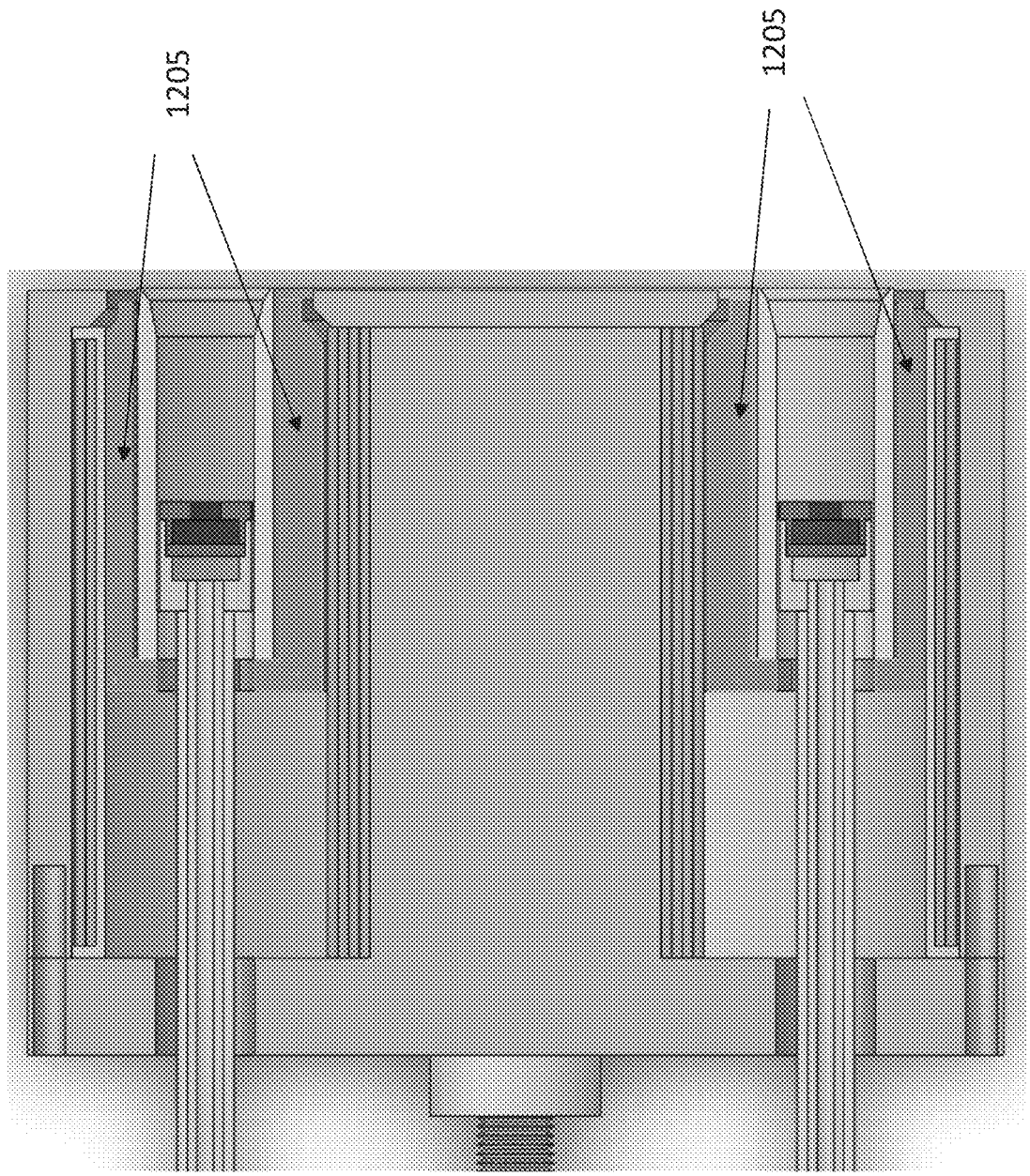
FIGS. 12-13 illustrate thrusters according to prior art.

Two geometric configurations of these screens have been used to design a MS Hall thruster magnetic circuit to date. The first configuration configures the cylinders as a magnetic shunt, which is a one-piece annular component with a U-shaped cross-section that surrounds the discharge channel. Originally implemented in Hall thrusters to improve beam focusing (i.e. lensing) through the introduction of a small amount of magnetic field curvature across the channel gap, the shunt is magnetically coupled to the thruster's magnetic circuit but does not physically connect to the other magnetic circuit components. A cross-section of one variant of such a Hall thruster, incorporating a magnetic shunt, is illustrated in FIG. 12. The magnetic shunt (1205) is illustrated in FIG. 12 in a cross section view. The magnetic shunt has azimuthal symmetry as can be understood from FIG. 12. The person of ordinary skill in the art will understand that Hall thrusters are generally illustrated as in FIG. 11 and FIG. 12, where the longitudinal direction of the thruster is in the plane of the figure, while the radial direction is perpendicular to the longitudinal axis, and the azimuthal direction is along a circumference in a plane including the radial directions, and normal to the longitudinal axis. Therefore, Hall thrusters in such cross section views generally have azimuthal symmetry with regard to several components, such as the magnetic shields and the cathode emitter.

The benefits of a magnetic shunt are its lower mass and reduced geometric interference with the thruster's internal components upstream of the discharge channel. However, because the shunt is not physically tied to the back pole, a shunt is not able to support large amounts of magnetic flux before saturating. Thrusters using magnetic shunts therefore tend to produce weaker MS field topologies, making it challenging to produce an optimal degree of curvature near the downstream edges of the discharge channel, to obtain a full magnetic shielding configuration. In addition, magnetic shunts are largely thermally isolated, which can cause problems with thermal-induced changes to their magnetic properties.

Figure 13:
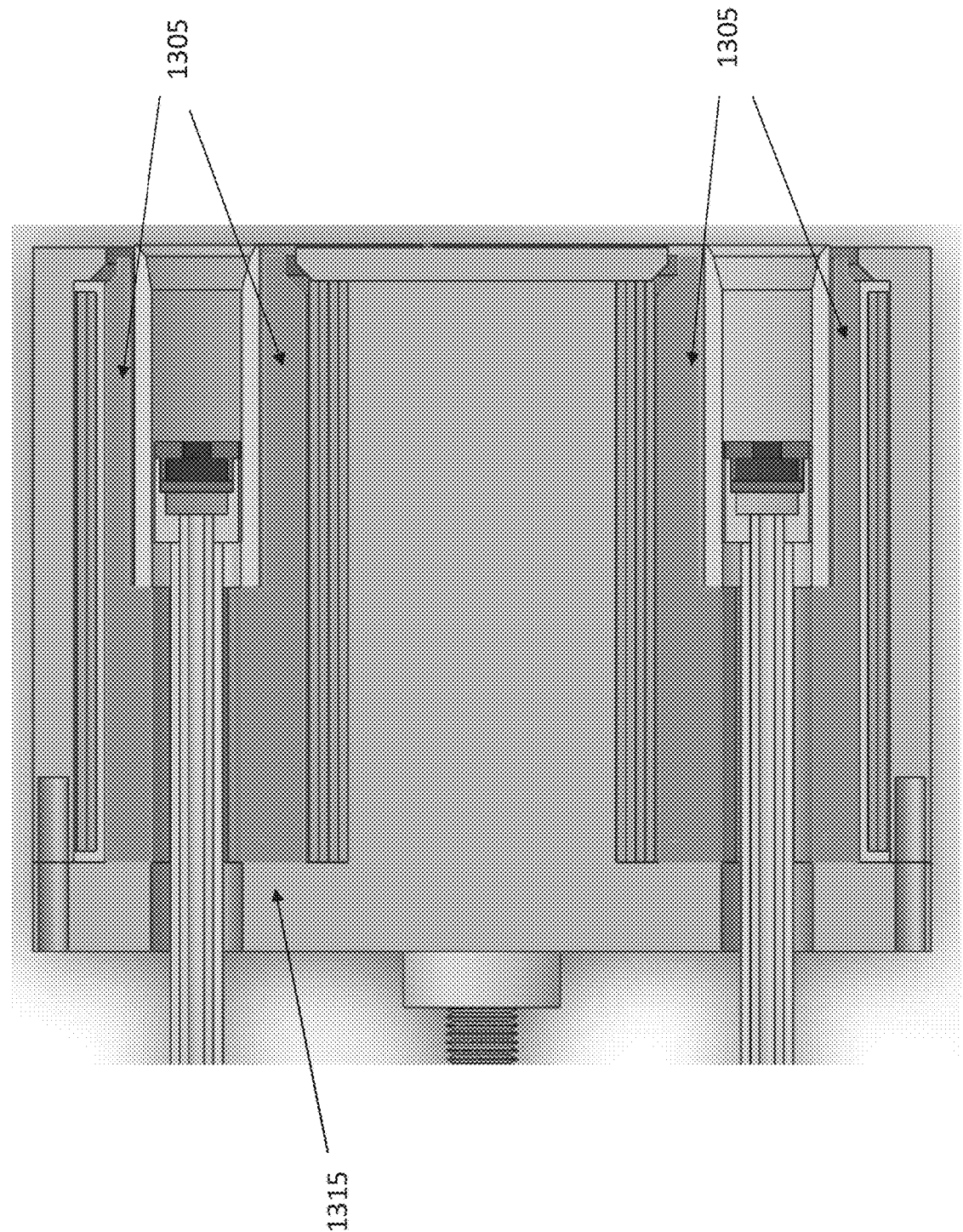

The second geometric configuration uses screens configured as a pair of concentric, hollow, cylindrical components located radially inward and outward from the discharge channel walls. The cylindrical components are physically connected to the thruster's back pole. This physical connection yields much stronger magnetic coupling to the thruster's magnetic circuit, and provides a strong thermal conduction path to the thruster's radiating surfaces, to control the temperature of the screens. Therefore, magnetic screens using this second geometric configuration are far less susceptible to magnetic saturation compared to shunts, and are able to generate stronger levels of magnetic shielding (i.e. a higher curvature in the magnetic field). A cross-section of a variant of a Hall thruster using magnetic screens is illustrated in FIG. 13. In FIG. 13, the magnetic screens (1305) are illustrated.

The difference described above between the first geometric configuration and the second geometric configuration can be noted by comparing FIG. 12 and FIG. 13. In FIG. 13, the screens (1305) are in physical contact to the back pole (1315), unlike the shunts (1205). Magnetic screens as in FIG. 13 are generally the preferred configuration for MS Hall thruster layouts. However, their need to physically tie to the thruster back pole makes the components longer than shunts, leading to a higher mass, and can impose geometric challenges for the internal layout of the thruster.

The problem with the two conventional MS Hall thruster architectures of FIGS. 12-13 is that neither of the two configurations scale well to the low power Hall thruster regime. The configuration of FIG. 12 is capable of only modest MS performance, while the configuration of FIG. 13 results in higher magnetic circuit mass. With sub-kW operating powers and thruster outer diameters of the order of 10 cm or less, low power Hall thrusters must accommodate very high magnetic flux densities (of the order of 0.1-1 T) to achieve high performance, while affording sufficient internal volume for internal components (propellant distribution, magnet coils, etc.).

Magnetic shunts (FIG. 12) have trouble handling these levels of magnetic flux, making it difficult to achieve a MS field topology at the sub-kW power level. The use of magnetic screens (FIG. 13) can significantly limit the internal volume available inside the thruster, driving the thruster design towards larger sizes, and therefore higher operating power requirements. A new geometric architecture to optimize all MS Hall thruster magnetic circuit geometries and to achieve MS for Hall thrusters operating in the low-power regime is therefore described in the present disclosure.

The present disclosure describes a one-piece magnetic screen design which employs a single connection point to the magnetic circuit's back pole. The one-piece magnetic screen is capable of handling the same magnetic flux densities as conventional magnetic screens, while reducing the internal volume (and mass) required by the magnetic circuit components. The magnetic screens are made of a magnetic material. For example, high permeability magnetic alloys are the most common for any Hall thruster magnetic circuit component such as the screen. MaSMi uses Hiperco-50A (an Iron-Cobalt-Vanadium alloy). However, other materials may also include Hiperco-50 (which has slightly different chemistry than the 50A), VIM VAR (vacuum melted low-carbon magnetic iron), or standard magnetic iron.

The one-piece magnetic screen is different compared to the magnetic shunts and magnetic screens. The one-piece screen has an h-shaped cross-section, and it is not purely cylindrical, combining the U shape of a magnetic shunt with a single upstream connection to the back pole. An exemplary one-piece magnetic screen implementation is illustrated in FIG. 11. The magnetic screen is illustrated as (1125), and forms a single connection (single because of the azimuthal symmetry for the cross section of FIG. 11) with the back pole (1130). It can be noted that the magnetic screen of FIG. 13 forms instead two connections with the back pole. It can also be noted that the magnetic screen of FIG. 11 has only one piece (it appears as two pieces only because FIG. 11 is a cross section with azimuthal symmetry), while the magnetic screen of FIG. 13 has two distinct pieces. As visible in FIG. 11, the upstream section of the internal cathode is longitudinally longer than the downstream section; for example, at least five times longer.

In some embodiments, the h-shaped magnetic screen therefore comprises, as visible in FIG. 11, a hollow cylinder at the upstream end, and two hollow cylinders at the downstream ends, with the two concentric cylinders joined by an annular shape corresponding to the horizontal line of the h shape.

The one-piece screen has several advantages over the use of a magnetic shunt or magnetic screen, and the significance of these advantages increases as the thruster scale is reduced. A first advantage is the single connection to the back pole, which enables the one-piece magnetic screen to support the high magnetic flux densities required for MS without saturating. The single piece exceeds the performance of a magnetic shunt in many applications and matches the performance of a pair of magnetic screens.

A second advantage is that, by using only a single connection point to the back pole, magnetic performance is maintained with significantly more uninterrupted internal volume available. Although the use of magnetic shunts yields the greatest internal volume due to their lack of a connection to the back pole, their poor performance (especially at lower powers) reduces their applicability. The single connection point used by the one-piece screen, ideally positioned at the outer radius of the screen, provides considerably more uninterrupted internal volume compared to magnetic screens. Additionally, the reduction in material required for the one-piece screen compared to conventional magnetic screens yields a lower total mass for the magnetic circuit. The outer radius position enables a greater utilization of the internal volume.

A third advantage is that the one-piece screen is a single component, and therefore has improved thermal conduction paths and improved magnetic coupling to the thruster. Both thermal and magnetic advantages are achieved through fewer mechanical joints, compared to either a magnetic shunt or magnetic screens. An additional benefit of the single integrated component is its increased structural integrity, which is beneficial during flight qualification environmental (shock and vibration) testing.

Therefore, as described above, a one-piece magnetic screen yields a reduction of mass, an increase in structural integrity, and an improvement to the thermal design of Hall thrusters of all scales. The lower thruster mass reduces the total mass of the propulsion subsystem and, consequently, the spacecraft dry mass. Increased structural integrity improves the thruster's ability to withstand vibration and shock loads imposed by launch and spacecraft separation. With total efficiencies in the range of 40-70%, improvements to the thermal design of Hall thrusters can aid in conducting waste heat towards the key radiating surfaces, ultimately improving thruster performance.

As visible in FIG. 11, the azimuthally-symmetrical discharge chamber has an annular shape, the single-piece azimuthally-symmetrical magnetic screen has an h-shape cross section, the h-shape cross section comprising a first prong at an upstream end and two prongs at a downstream end, the single-piece azimuthally-symmetrical magnetic screen comprises a first hollow cylinder physically contacting the back pole at a single circular point of contact, the single-piece azimuthally-symmetrical magnetic screen comprises a second and third hollow cylinders, the second hollow cylinder being concentric to the third hollow cylinder, and the azimuthally-symmetrical discharge chamber comprises a radially-outward wall and a radially-inward wall. The second hollow cylinder of the single-piece azimuthally-symmetrical magnetic screen encircles the radially-inward wall of the azimuthally-symmetrical discharge chamber, and the third hollow cylinder of the single-piece azimuthally-symmetrical magnetic screen encircles the radially-outward wall of the azimuthally-symmetrical discharge chamber, thereby forming a magnetic field protecting the radially-outward wall and the radially-inward wall of the azimuthally-symmetrical discharge chamber from erosion due to ion bombardment.

Figure 28:
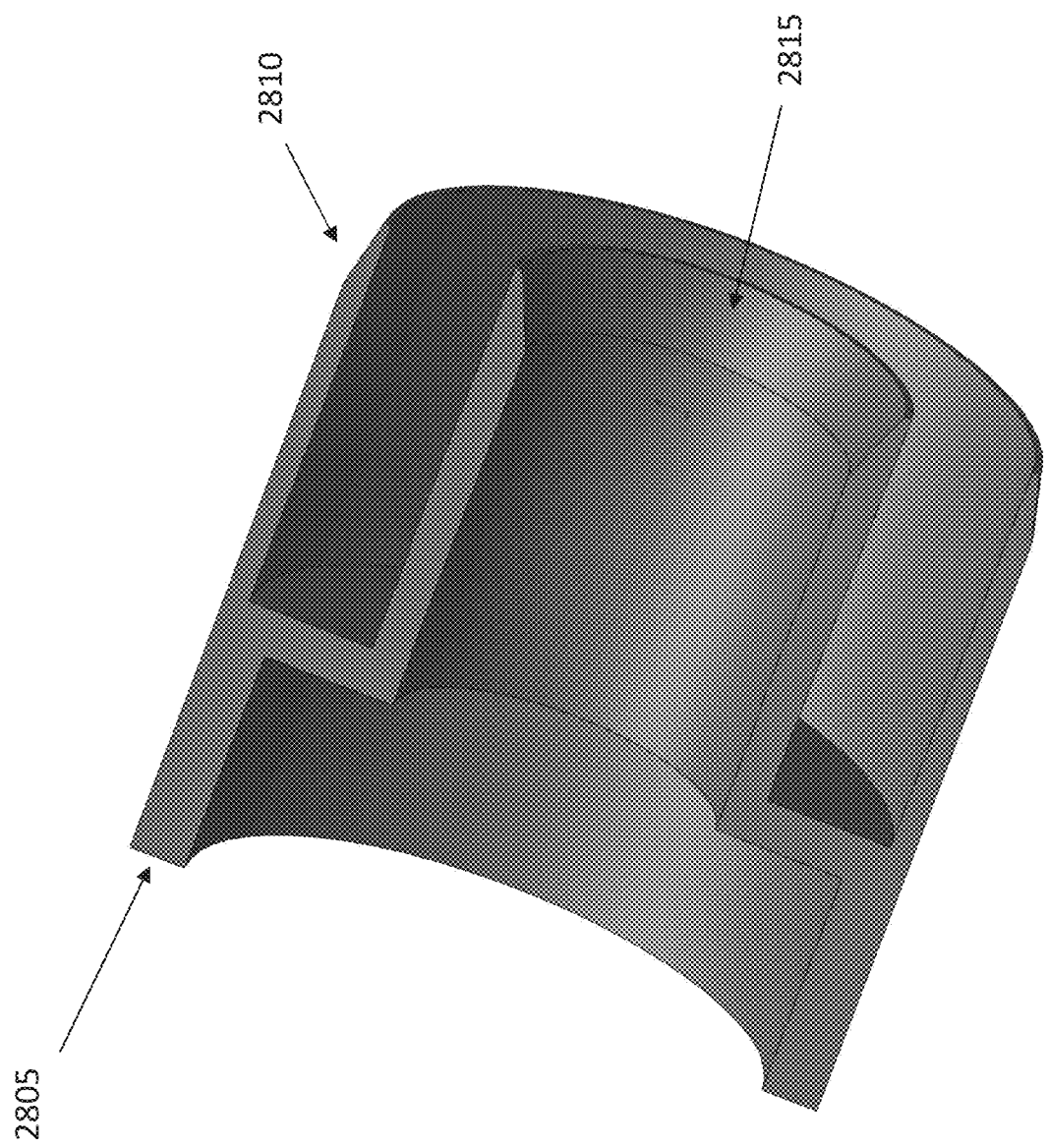
FIG. 28 illustrates an exemplary single-piece magnetic screen.

FIG. 28 illustrates an exemplary single-piece magnetic screen (with a cut-out view), corresponding to the screen (1125) of FIG. 11. FIG. 28 illustrates how the h shape cross section generates the 3D volume of the screen by azimuthal rotation. The resulting screen shape has a first hollow cylinder (2805) at the upstream end, contacting the back pole, and two other cylinders. One cylinder (2810) is located radially-outward, while the other (2815) is located radially-inward. The downstream ends of the cylinders have slanted edges. Each edge is slated in the opposite direction, as visible in FIG. 28.

At the low power regime (sub-kW), a one-piece magnetic screen is an enabling feature for efficient magnetically shielded Hall thrusters. In addition to the benefits listed above (the most important of which is the thermal design due to the inherently lower efficiency of lower-power Hall thrusters), the one-piece magnetic screen frees up considerable volume inside the thruster. This facilitates and, at very low powers, enables the design and development of low-power MS thrusters.

As described above in the present disclosure, propellant flow uniformity in the discharge channel of Hall thrusters is a key contributor to the thruster performance at all power levels. Uniform propellant flow azimuthally around the discharge channel provides an evenly distributed neutral particle flux to the thruster's ionization region. The even distribution enables a balanced thrust to be generated by the thruster around the full annulus of the channel, so that there are no local regions of high neutral density that could generate an asymmetric thrust vector. This uniformity also increases the probability for high levels of propellant ionization (>90% is possible in Hall thrusters), which is correlated to a thruster's propellant mass utilization efficiency and current utilization efficiency, and thus total efficiency. Anode manifolds should therefore be designed to provide the most azimuthally uniform neutral gas flow fields as possible.

The neutral gas flow field inside a Hall thruster discharge channel is produced by the pressure difference across the anode manifold (i.e. the propellant gas distributor). The propellant gas is supplied to the anode with a small upstream backpressure (≤50 Torr) and flows to the discharge chamber (near vacuum). The neutral propellant density from the anode produces a local pressure of the order of 10 mTorr in the channel. The internal geometry of the anode manifold governs the distribution of propellant in the azimuthal direction, while the anode's exit orifice configuration determines the propellant's diffusivity (i.e. how wide or narrow the propellant stream is in the radial direction). The diffusivity is directly coupled to the propellant particle trajectories encouraged by the anode exit geometry. Neutral trajectories that follow predominantly radial paths rather than axial paths have a longer dwell time in the discharge channel due to bouncing between the channel walls. This improves diffusivity by providing more time for the flow to develop into an azimuthally uniform flow field as the bulk flow moves axially along the channel.

Significant efforts have been made to enhance propellant flow uniformity in Hall thruster anodes. NASA's generally accepted acceptance criteria for an anode manifold is ±5% from the mean flow corresponding to a maximum peak-to-peak non-uniformity of ≤10%. Many contributors to poor azimuthal flow uniformity in Hall thruster anodes can be identified, including anode manifold internal geometry, manufacturing process accuracy, manufacturing repeatability, etc. For example, the H6 anode creates a high azimuthally uniform propellant flow field, with the three fabricated units having maximum peak-to-peak non-uniformities of 4.4%, 4.6% and 7% from the mean flow. The anode manifold on NASA's next-generation 12.5 kW HERMeS Hall thruster shares little geometric similarity with the H6 anode, but was intended to provide improved propellant flow uniformity through a conductance-balanced design. However, the HERMeS anode manifold generated a greater maximum peak-to-peak non-uniformity than that of the H6, representing a reduction in uniformity performance. A manufacturing repeatability issue was observed for the H9 thruster, which uses the same anode design as the H6. Three H9 anodes were produced, demonstrating maximum peak-to-peak non-uniformities of 4.1%, 4.6%, and 9.2% at a low-flow condition and 3.4%, 3.6%, and 6.5% at a high flow condition. While two of the units were highly uniform and all of the units pass NASA's criteria, the third unit was a factor of 2× less uniform than the first two units.

The inability to consistently design and fabricate anode manifolds that produce sub-5% peak-to-peak non-uniformities represents a non-trivial problem in Hall thruster design and development. Solving this problem will yield higher performance from future NASA Hall thrusters. The solution to this problem, as described in the present disclosure, is to build off of the strong demonstrated performance of the H6 anode manifold and develop a novel anode geometry that generates an exceptionally uniform flow field, while using clearly-outlined manufacturing processes to ensure consistency between units.

The anode manifold design that solves this problem as described in the present disclosure is herein called the High Uniformity Distribution (HUD) anode. The HUD anode comprises two sections. The first section comprises the propellant delivery to the manifold, including tubing between the pressure-regulated propellant source and the anode manifold. This region is thruster-specific, simple to integrate into the anode manifold, and arbitrary from the perspective of the anode manifold design. Therefore, it will not be discussed in the present disclosure since it can be understood by the person of ordinary skill in the art. The second section is the anode manifold itself, which accepts a propellant supplied by the arbitrary propellant tube of the first section, and generates a highly uniform flow field downstream of the anode based on its internal geometry.

Figure 17:
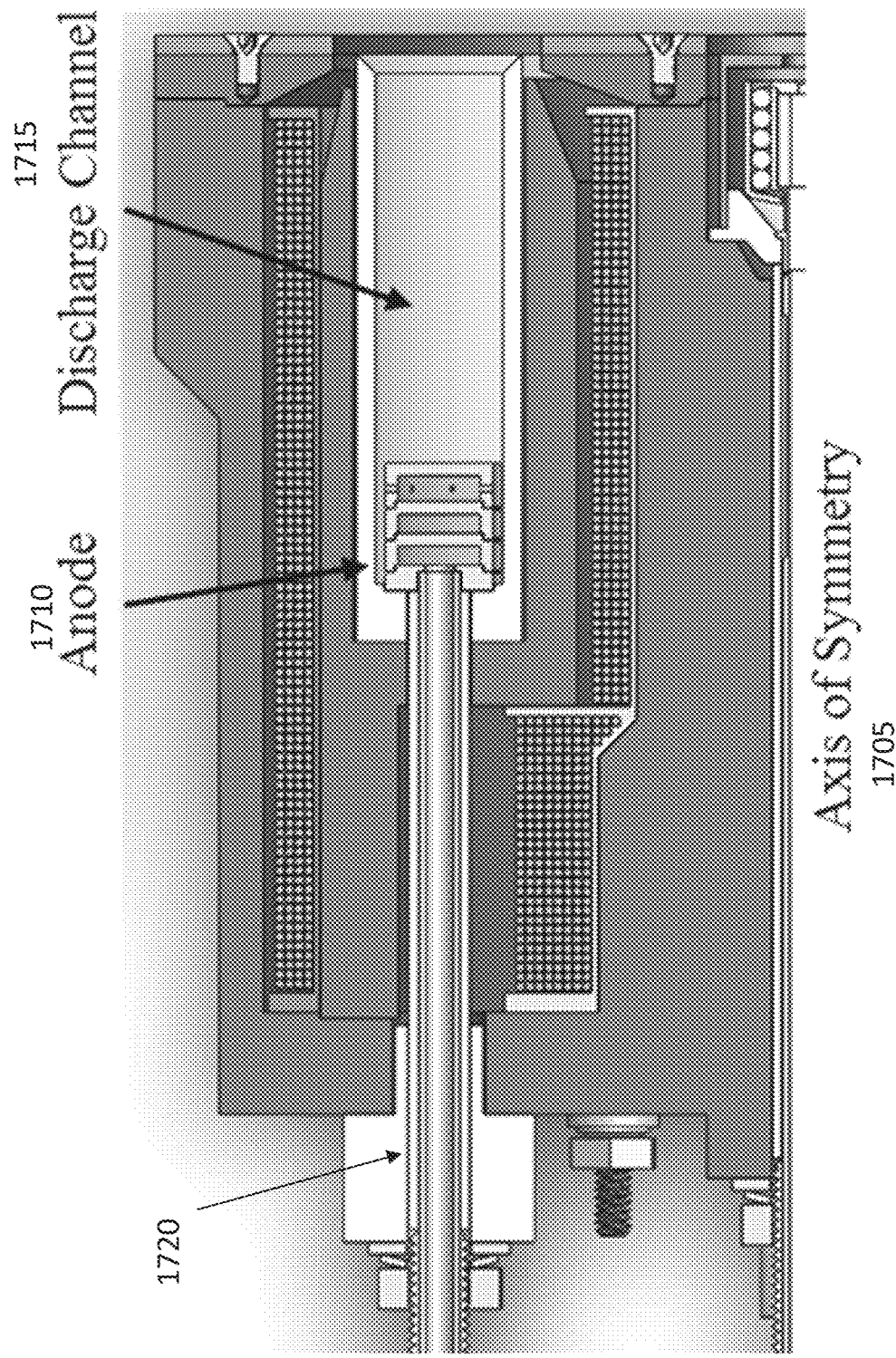
FIG. 17 illustrates a cross section of the MaSMi-DM Hall thruster highlighting the anode manifold location relative to the discharge channel.

A cross-section of a Hall thruster showing the location of the anode relative to the discharge channel (in this case, JPL's MaSMi-DM) is illustrated in FIG. 17. FIG. 17 illustrates a detail of the thruster of FIG. 9 and FIG. 11, therefore several parts of the structure can be understood from the description of FIG. 9 and FIG. 11. FIG. 17 highlights the axis of symmetry of the thruster (1705), as well as the anode (1710), and the discharge channel or chamber (1715). The person of ordinary skill in the art will understand that parts of the thrusters illustrated in the drawings of the present disclosure, such as for example the discharge channel (1715) and the anode (1710), have azimuthal symmetry along axis (1705); these are concepts readily understood by the person of ordinary skill in the art and are therefore omitted for brevity and clarity in describing the innovative features. In particular, the anode (1710) has baffles with a rectangular cross section, as described below in the present disclosure, and has azimuthal symmetry along axis (1705).

A key feature of anode manifolds that generate highly azimuthally uniform flow fields is the presence of at least two azimuthal flow distribution baffles separated by choke rings (i.e. two flat annular rings within the anode, each with a set of axial holes for gas flow to pass through) prior to the anode manifold exit. The rate at which the propellant passes from one region (i.e. baffle) inside the anode to the next is determined by the geometry and total area of the orifices between the two baffles, as well as the geometry of the baffles themselves.

It was previously believed that the flow must be choked at each orifice because this condition dictates a constant flow rate for a given orifice geometry and pressure difference across the orifice. However, because pressure can vary azimuthally around the anode in a given baffle, the pressure drop across each hole on a given choke ring may not be the same. This may lead to choked flow at some or all of the choke ring holes, but the flow rates may be different due to the variation in the pressure drops across those holes. However, recent testing has identified that having choked flow at all of the anode orifices is not actually a requirement.

Achieving high propellant uniformity requires for the flow resistance in the azimuthal direction within a given baffle to be much lower than the flow resistance through the orifices out of the baffle (by an order of ≥100). This requirement is expressed as a ratio of the two flow resistances. Physically, this condition enables free azimuthal propellant flow in the baffle, until the baffle fills with gas, thereby forcing a gas flow through the axial orifices into the next baffle. The flow resistance is inversely proportional to the flow conductance. In the case of the HUD anode, the azimuthal baffles have a rectangular cross section, and the orifices between baffles have a circular cross section. As such, the flow resistances (R) and the resistance ratio can be expressed as follows:

$$R_{circular\,orifice} = \frac{8\mu L_c}{\pi r^4} \quad (8)$$

$$R_{rectangular\,annulus} \approx \frac{12\mu L_r}{wh^3\left(1 - 0.63\frac{h}{w}\right)}$$

Flow Resistance Ratio =

$$\frac{R_{circular\,orifice}}{R_{rectangular\,annulus}} \approx \frac{2nL_c wh^3\left(1 - 0.63\frac{h}{w}\right)}{3\pi r^4 L_r} \geq 100$$

where $\mu$ is the viscosity of the propellant, $L_c$ is the length of the circular orifice, r is the radius of the circular orifice, $L_r$ is the midline annular length of the rectangular annulus, w is the rectangular annulus cross section width, h is the rectangular annulus cross section height, and n is the number of orifices.

Figure 27:
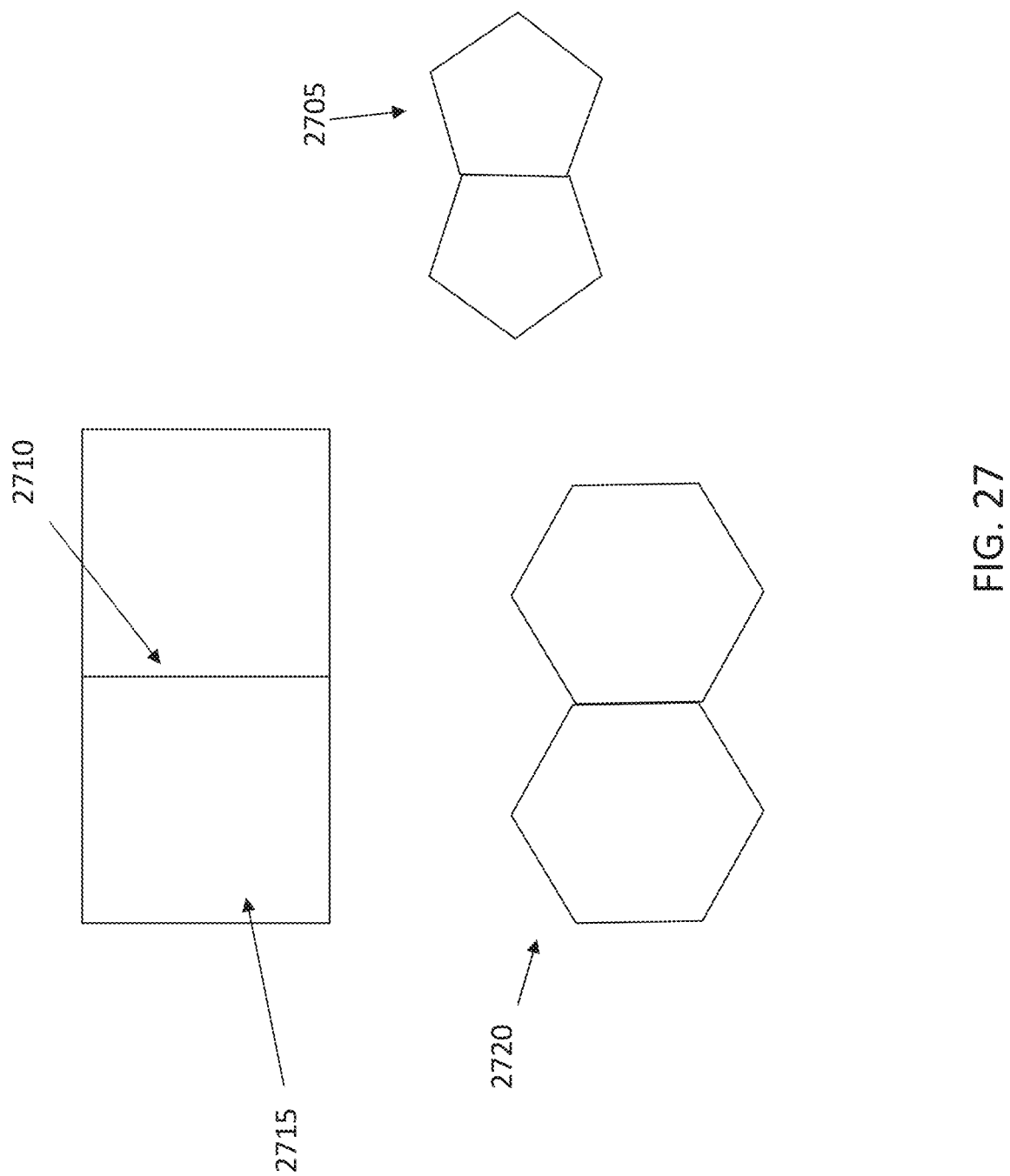
FIG. 27 illustrates exemplary baffle cross sections.

In some embodiments, the number of orifices should increase moving downstream through the anode (i.e. from one choke ring to the next), to generate the desired pressure drop and to give a greater number of propellant sources to further distribute the flow azimuthally. Using only one set of holes does not provide sufficient propellant distribution azimuthally around the anode, resulting in lower propellant flow uniformity. In some embodiments, the cross section of the baffles is not rectangular, but may be chosen from different shapes, such as, for example, square, pentagonal and hexagonal. These exemplary cross sections are illustrated in FIG. 27, which shows how each adjacent baffle has one adjacent edge (2710). Exemplary shapes are square (2715), pentagonal (2705) and hexagonal (2720).

Figure 18:
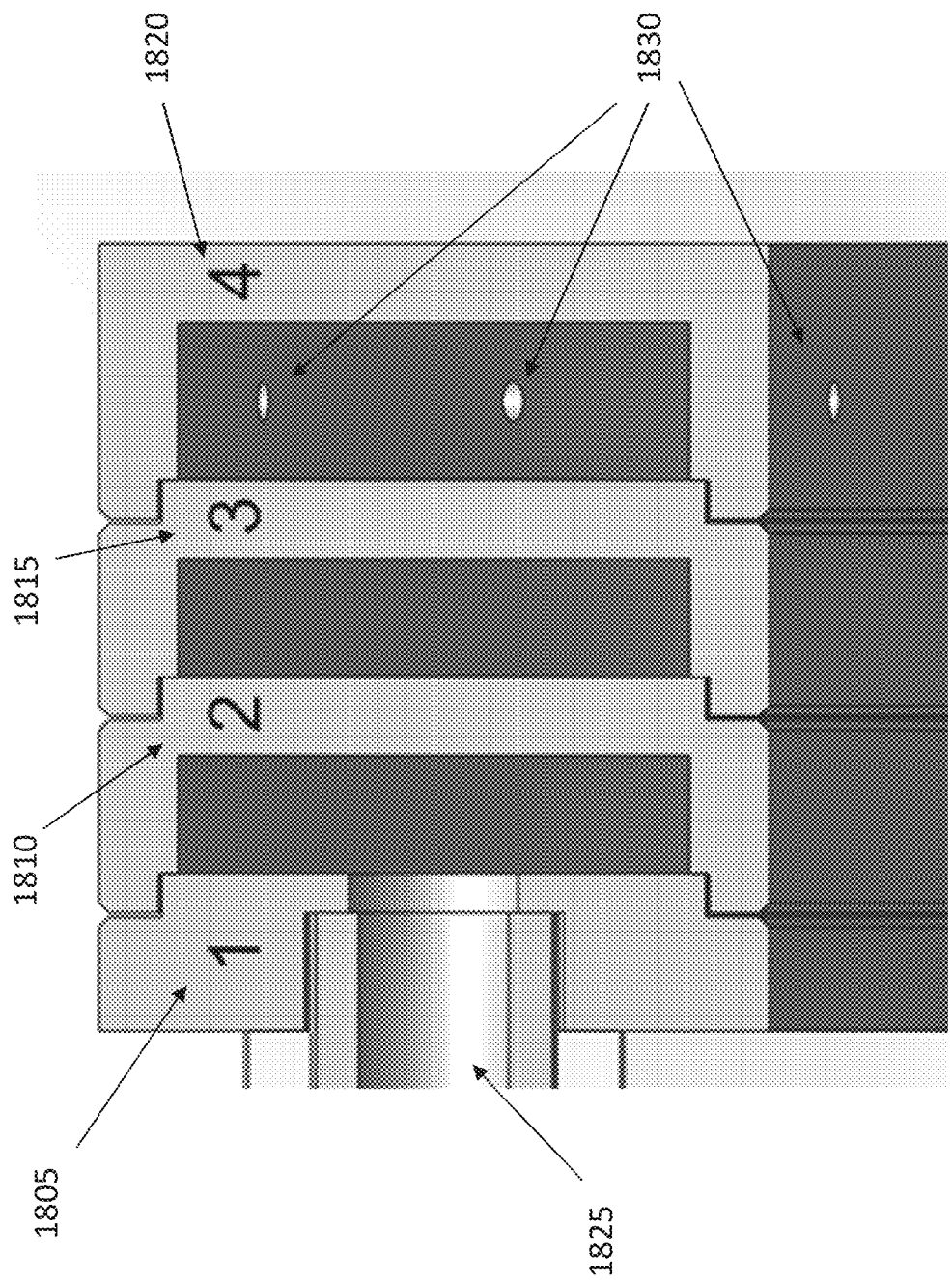
FIG. 18 illustrates the anode and baffles.

FIG. 18 illustrates the HUD anode cross-section, as a detail of (1710) of FIG. 17. The HUD anode manifold consists of four precision-machined interlocking rings, each with a set of orifices with a unique size and pattern. These rings are stacked and welded or brazed together during final assembly. Ring 1 (1805) is the "anode base plate" and accepts the propellant from a supply line, such as (1720) in FIG. 17 and (1825) in FIG. 18. Ring 2 (1810) is the "upstream choke ring" and, when mated to the anode base plate, creates a closed annular volume called the "upstream baffle." It has a series of axially-oriented orifices designed to generate high flow resistance to the next baffle. Ring 3 (1815) is the "downstream choke ring" and, when mated to the upstream choke ring, creates a closed annular volume called the "midstream baffle." It also has a series of axially-oriented orifices designed to generate high flow resistance to the next baffle. Ring 4 (1820) is the "anode cap" and, when mated to the downstream choke ring, creates a closed annular volume called the "downstream baffle." It has a series of radially-oriented orifices that are designed to encourage radial trajectories of the propellant into the discharge channel. The design of the anode cap is a key feature of the HUD anode. FIG. 18 illustrates some exemplary holes (1830) in the anode cap (1820), oriented radially outward and inward from the longitudinal axis of the anode. Multiple such holes are present in each of the lateral sides of the baffles, which have a rectangular cross section. In some embodiments, only the last (downstream) baffle has radially oriented holes.

Because the HUD anode is scalable depending on the Hall thruster size, the design does not have a specific number of axial and radial orifices. However, in some embodiments one or more of the following aspects of the design should be maintained to achieve highly uniform flow fields and consistency in manufacturing: The flow resistance from one set of orifices to the baffle immediately upstream should be maintained at ≥100 with the exception of the anode cap orifices and the downstream baffle, which are in place to generate a predominantly radial flow of the propellant from the anode manifold; The resulting pressure ratio from one baffle to the next at steady-state, derived from the criteria above (i.e. ≥100 flow resistance), should be maintained at ~4; All axial orifices should have a small diameter (of the order of 0.25 mm) and have a long length-to-diameter ratio (of the order of 2:1) to encourage continuous flow (i.e. low Knudsen number); The anode cap should have radial orifices (cross-drilled or offset) to direct flow radially; The radial holes should be small in diameter, but larger than the axial holes (of the order of 0.5 mm) and have a moderate length-to-diameter ratio (of the order of 1:1) to encourage a large radial component of velocity in the propellant flow out of the anode manifold; The anode should be assembled with the maximum azimuthal orifice offset between adjacent choke rings to prevent direct line of sight through the two sets of orifices; All orifices should be machined using EDM (electrical discharge machining) or a similar process to ensure consistency between each orifice diameter; The orifices should not be machined using traditional drill bits as they produce much higher variability in diameter and hole finish from orifice to orifice; The interlocking feature of the four anode rings should be retained for simplicity and consistency in fabrication. This feature also facilitates welding or brazing the assembly as all component-to-component joints have external access. In some embodiments, all criteria above are followed.

Using the above tenants for a high-uniformity anode manifold, the MaSMi-DM anode was designed and fabricated. Parts for five anodes were fabricated, two of which was assembled and tested to date. Prior to assembly, all of the orifices from the five sets of parts were measured. The EDM process used to make the orifices yielded <0.025 mm variance from orifice to orifice over all of the five sets, representing exceptional manufacturing consistency. The number and size of the orifices, the pressure ratios across each choke plate, and the flow resistance ratios across each choke plate are presented in Table 1.

TABLE 1

| Location | Orifice Diameter | # of Orifices | Pressure Ratio | Resistance Ratio |
|---|---|---|---|---|
| Upstream Choke Ring | 0.25 mm | 8 | 4 | 540 |
| Downstream Choke Ring | 0.25 mm | 24 | 9 | 180 |
| Anode Cap | 0.50 mm | 48 | 4 | 5.7 |

Figure 19:
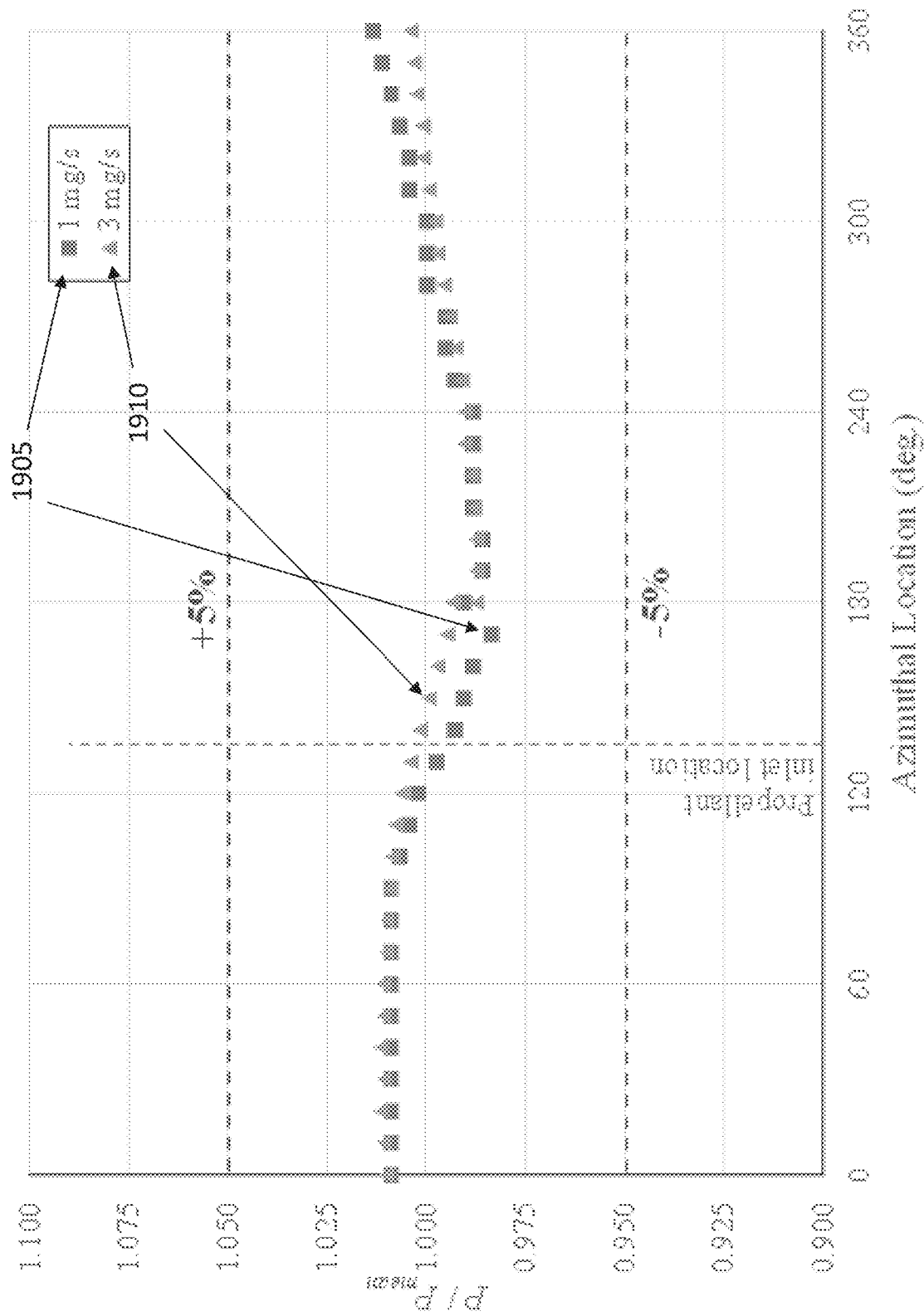
FIGS. 19-20 illustrate the measured azimuthal propellant distribution for two anode manifolds.
Figure 20:
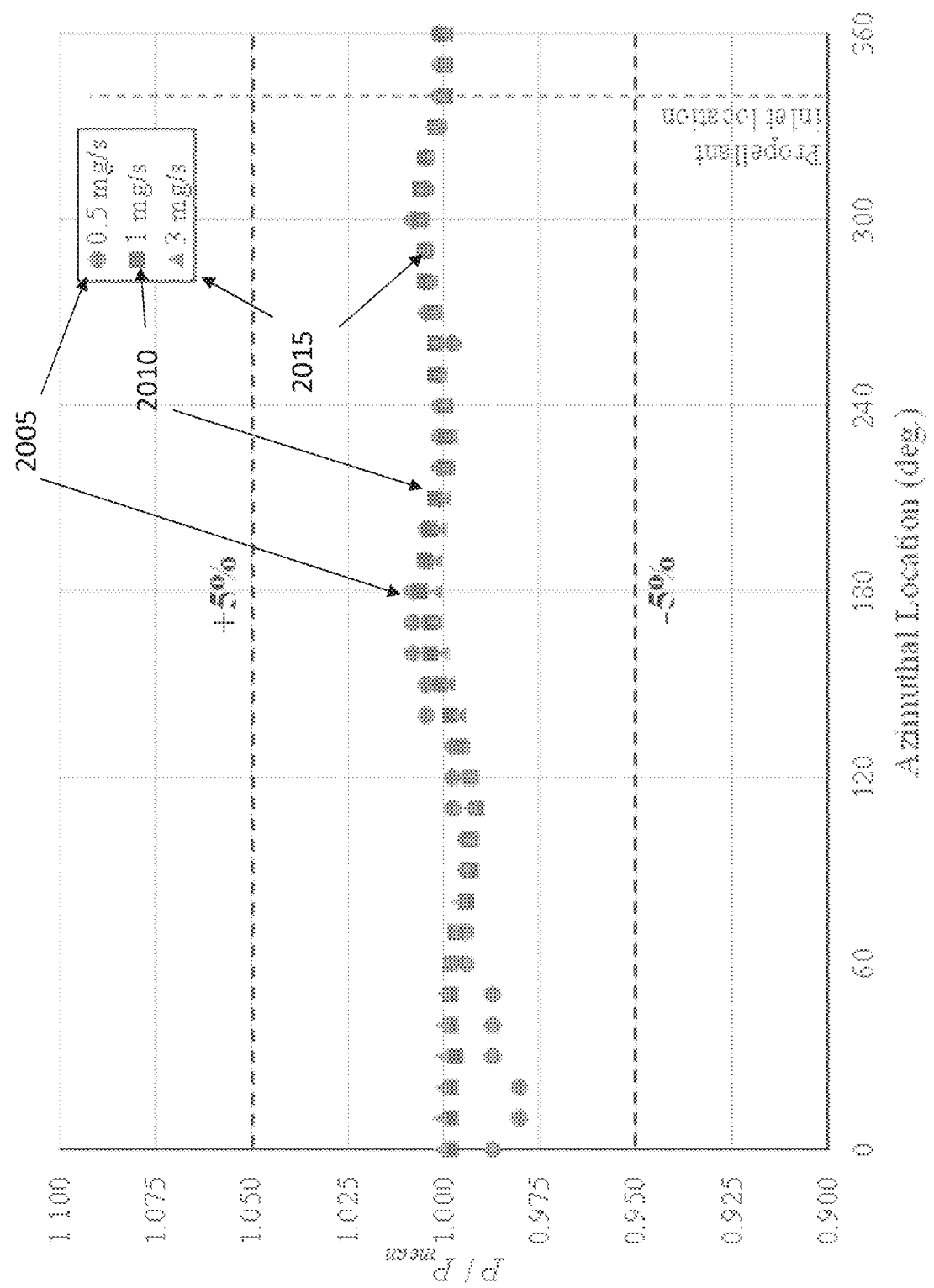

Two MaSMi-DM anode manifolds (SN 1 and SN 2) were fabricated and tested for azimuthal propellant flow uniformity. Measurements of the azimuthal flow distribution for SN 1 were taken at xenon flow rates of 1 mg/s and 3 mg/s. An additional flow condition of 0.5 mg/s was added for the testing of SN 2. To ensure repeatability with the flow uniformity measurement, each azimuthal location was measured twice per flow rate (rotating the manifold ±360°). The azimuthal propellant distribution for anode manifolds SN 1 and SN 2 are presented in FIGS. 19-20 as the ratio of the local pressure (P) and the average azimuthal pressure ($P_{mean}$). FIG. 19 illustrates data for flow rates of 1 mg/s (1905) and 3 mg/s (1910). FIG. 20 illustrates data for flow rates of 0.5 mg/s (2005), 1 mg/s (2010) and 3 mg/s (2015). The peak-to-peak non-uniformity of SN 1 was 3.2% at 1 mg/s and 2.6% at 3 mg/s. These values decreased with SN 2, which demonstrated 2.8%, 1.5%, and 1.3% at 0.5 mg/s, 1 mg/s, and 3 mg/s, respectively. Based on these results, the HUD anode appears to be the most uniform anode manifold tested and published to date.

It should be noted that various modifications can be made to the HUD anode to improve its resilience to the non-flight environments of ground testing. Ground test concerns for the HUD anode center around carbon that is back-sputtered from the vacuum facility walls and that adheres to the discharge channel and anode. Risks and mitigation techniques may include but are not limited to: 1. Increasing the diameter of the anode cap radial holes; and 2. Adding a lip to the downstream end of the anode cap.

Increasing the diameter of the anode cap radial holes reduces the risk of clogging due to particulate separating from the discharge channel wall. Over long-duration tests, back-sputtered carbon from a vacuum facility can collect and subsequently separate from the discharge channel in small clumps. Due to the clumps following the pull of gravity, this is primarily a concern at the top (12 o'clock) position of the HUD anode along the outer diameter and at the bottom (6 o'clock) position of the HUD anode along the inner diameter. Because the HUD anode design does not require the orifices in the anode cap to be choked, their diameters can be increased without compromising the neutral flow uniformity produced by the anode manifold.

Figure 21:
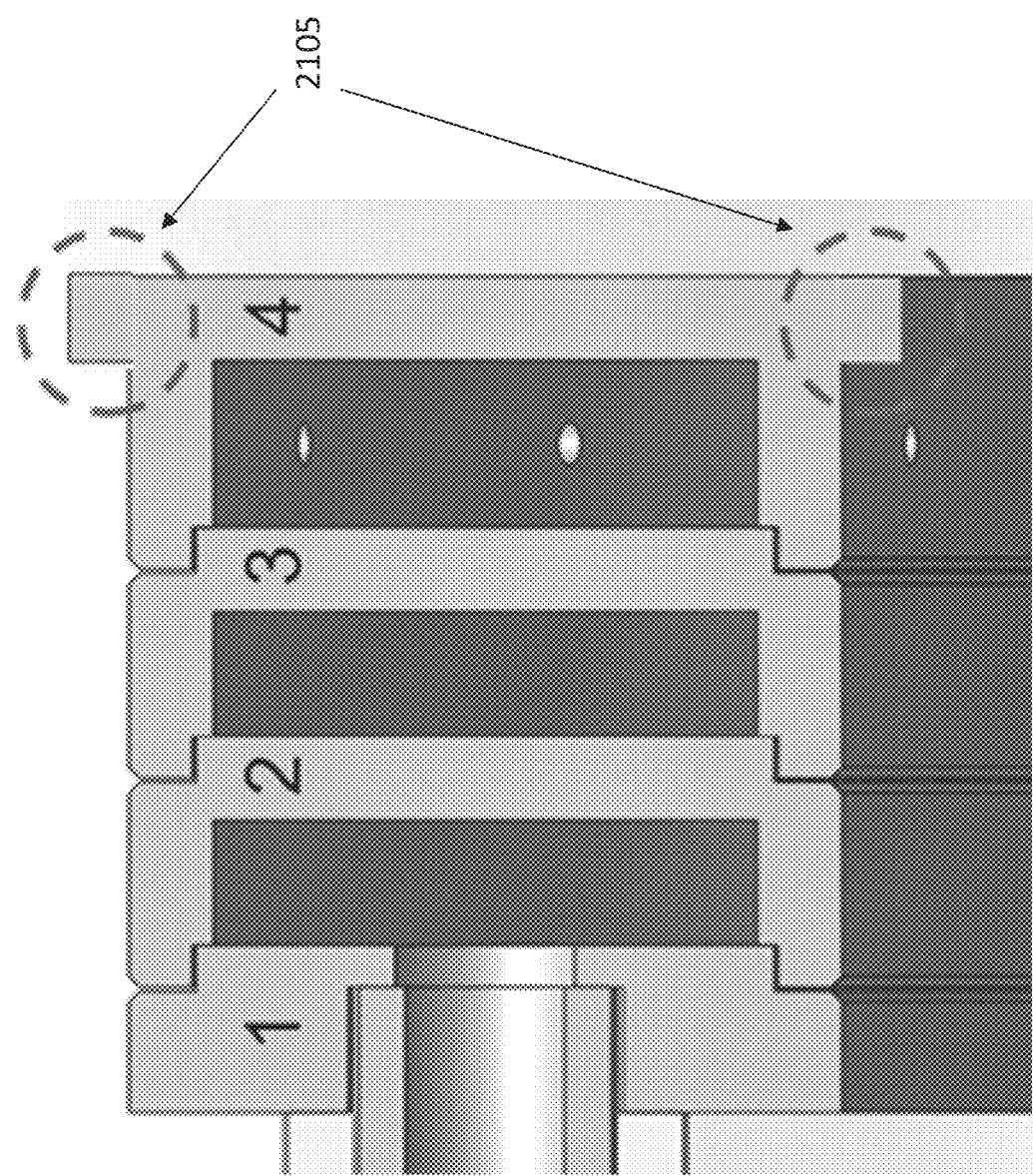
FIG. 21 illustrates a cross section of the HUD anode with line-of-sight blocking lips added to the downstream end of the anode cap.

Adding a lip to the downstream end of the anode cap can reduce line-of-sight of the back-sputtered carbon to the upstream portions of the discharge channel and anode, reducing the deposition of back-sputtered carbon in these regions. This in turn will prevent electrical shorts between the anode and the conducting carbon coating of the discharge channel in long-duration tests. This modification does not change the core functionality of the HUD anode and will still enable the production of a high-uniformity neutral flow. An example of this configuration is shown in FIG. 21 (2105).

The HUD anode generates the most azimuthally uniform propellant flow distribution of any Hall thruster anode tested and published to date. Furthermore, the design is simple, easily repeatable using the clearly defined manufacturing processes above, and scalable to any thruster power level. An anode that generates an ultra-high azimuthally uniform propellant flow field has the potential to improve thruster total efficiency by several percentage points when compared to less uniform anodes (accomplished by improving the mass and current utilization efficiencies). High uniformity flow fields can generate thrust vectors that are more closely aligned with the thruster's centerline axis, reducing the need for gimbal compensation in flight. Because the anode mass is largely dependent on the Hall thruster power level and varies by very small amounts within that given power level, there is no or little mass penalty for using the proposed HUD anode. By standardizing the machining process of the anodes and using highly consistent machining practices, the unit-to-unit variability can be minimized. Since the HUD anode is not dependent on thruster power level, it is widely applicable to all Hall thruster power regimes.

As known to the person of ordinary skill in the art, Hall thrusters are generally azimuthally symmetric with the primary region of the anode or manifold being annular in shape. The axis of symmetry in the drawings of the present disclosure will be readily understood by the person of ordinary skill in the art.

Figure 22:
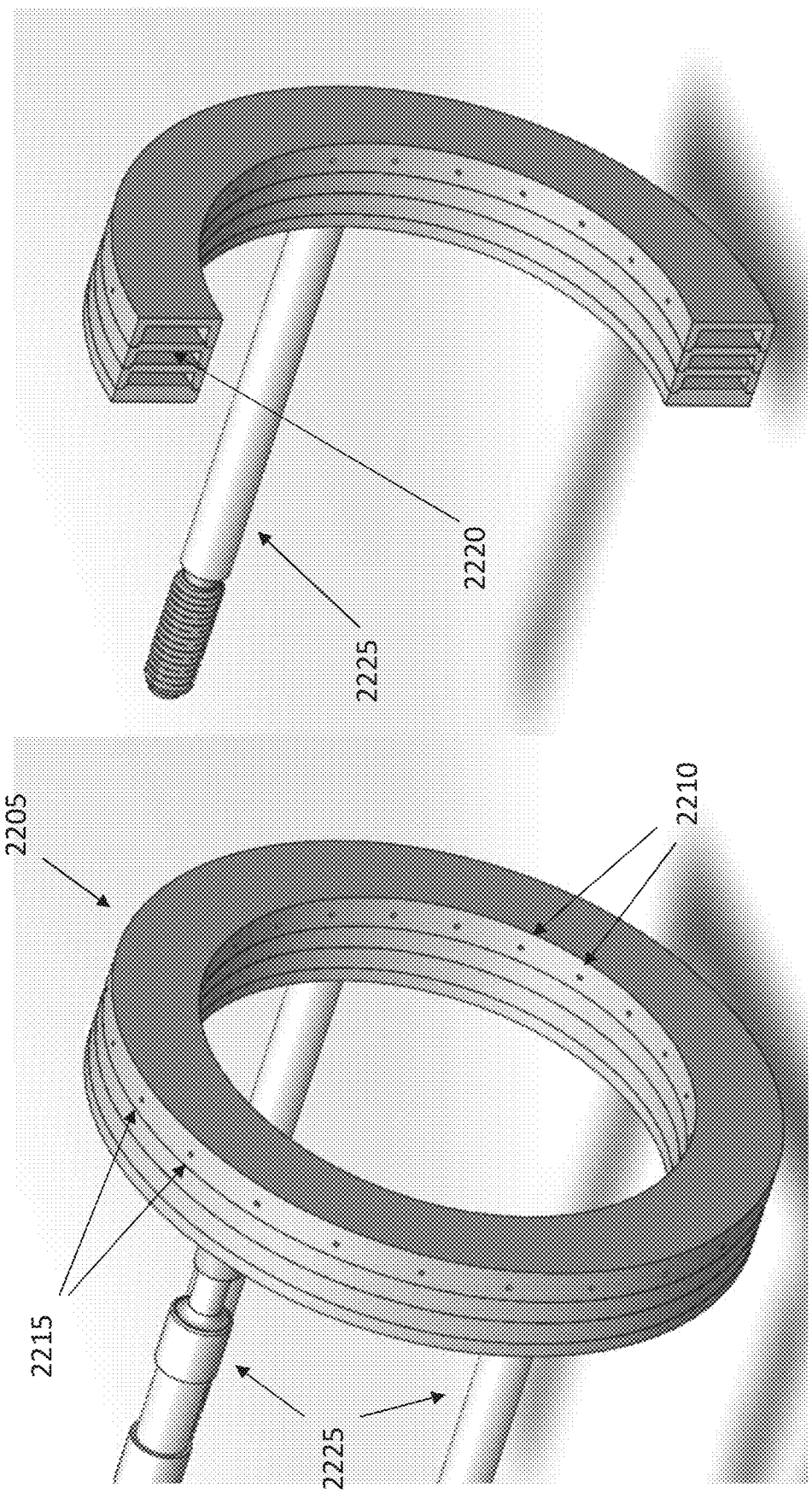
FIGS. 22-23 illustrate exemplary rectangular cross section baffles for the anode of FIG. 18.

As described above, the cross-sections of the baffles that form the anode are rectangular. FIG. 22 illustrates exemplary rectangular cross section baffles (2205), each of them being an annular ring. These rings are adjacent, and in this example for three consecutive spaces for propellant flow with a rectangular cross section (2220). The propellant is supplied by one or more supply lines (2225). For example, three supply lines may be used. Each supply line supplies propellant gas in the first baffle. The gas moves between consecutive baffles through circular openings. One or more circular openings may connect adjacent baffles. For example, if three supply lines are used, three circular openings may be used. The openings are not aligned with each other in consecutive baffles, to form a discontinuous path between the first baffle attached to the supply line, and the anode cap. The misalignment encourages azimuthal uniformity for the gas flow. In some embodiments the circular holes are equally spaced within the same baffle, and have the maximum offset possible with respect to the adjacent baffles. For example, if there are three circular axial holes, they can be placed 120° apart; if the next baffle also has three axial holes, these could be placed 120° with respect to each other, but offset by 60° relative to the previous set of holes.

Figure 23:
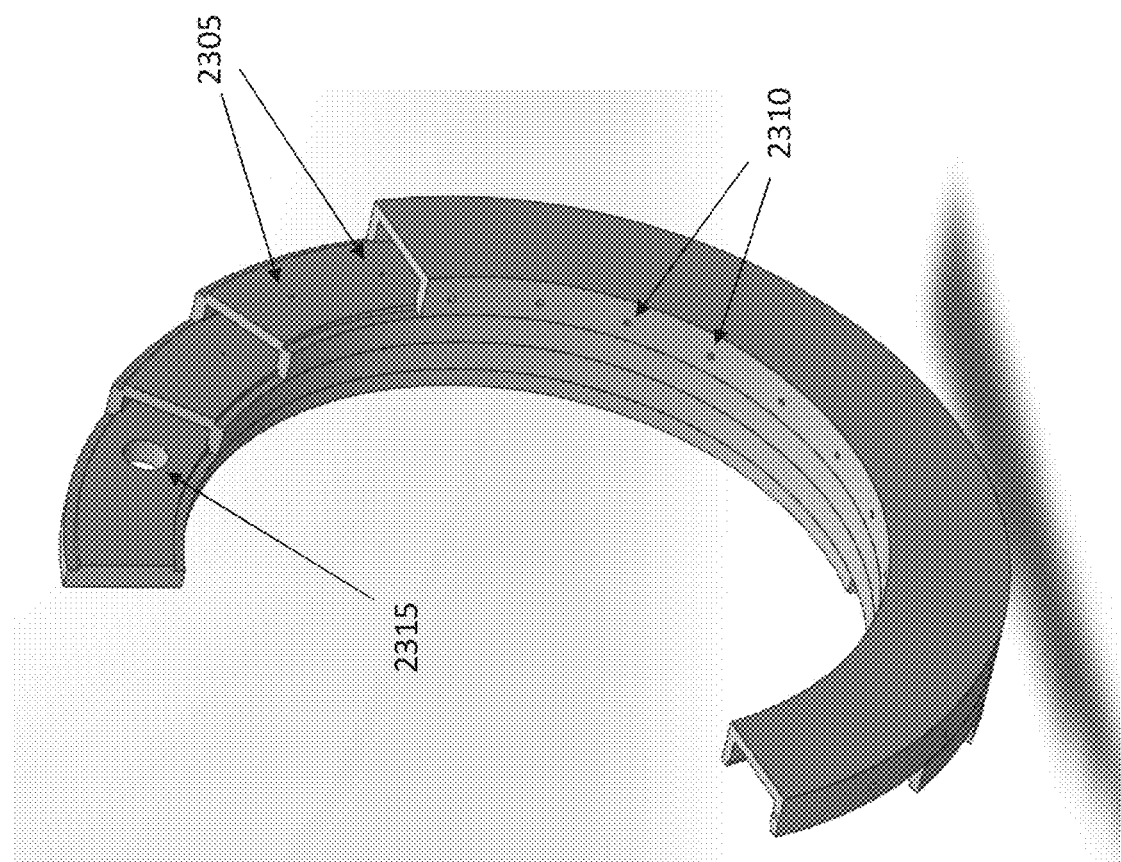

FIG. 22 illustrates multiple holes in the anode cap, in particular pointing radially inward (2210) from the central longitudinal axis of the anode, and radially outward (2215). Comparing FIG. 22 and FIG. 23, can be noted that the radial holes (2210, 2215) are larger than the axial holes between baffles (2305). The radial holes (2210, 2215) may be circular or have other shapes. The axial holes (2305) may be circular or have other shapes as well. FIG. 23 illustrates exemplary circular holes connecting adjacent baffles (2305), as well as axial holes (2310). FIG. 23 also illustrates a larger axial hole (2315) used for the supply line connecting to the first baffle, upstream. One or more of such larger axial holes may be used to connect to the supply line. In some embodiments, the total surface area of the holes connecting to the supply line is larger than that of the holes connecting the first and second baffles, and larger than the holes connecting the second and third (most downstream) baffle. Similar arrangements can be made if two or more than three baffles are used. The radial holes have a total area larger than the holes connecting the downstream baffles.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A Hall thruster comprising:
   a center axis oriented from an upstream section of the Hall thruster, the upstream section housing a back pole for a magnetic circuit and a supply line for a gas propellant, to a downstream section concentric with an azimuthally-symmetrical discharge chamber;
   the magnetic circuit comprising a center core, the center core comprising a counter bored cathode bore formed within the center core;
   the counter bored cathode bore extending along the center axis, the counter bored cathode bore comprising:
   an upstream bore having an upstream bore diameter and an upstream bore length along the center axis;
   a downstream bore having a downstream bore diameter greater than the upstream bore diameter and a downstream bore length along the center axis, wherein the downstream bore length is shorter than the upstream bore length and, wherein the downstream bore is a counterbore of the upstream bore;
   an internally-mounted cathode placed within the cathode bore, the internally-mounted cathode comprising:
   an upstream section having an upstream cathode diameter and an upstream cathode axial length, wherein the upstream cathode diameter is an outermost diameter of the upstream section;
   a downstream section having a downstream cathode diameter greater than the upstream cathode diameter and a downstream cathode axial length shorter than the upstream cathode axial length, wherein the downstream cathode diameter is an outermost diameter of the downstream section;
   wherein the downstream section is positioned within the counterbore, and the upstream section is positioned within the upstream bore.

2. The Hall thruster of claim 1, wherein said upstream cathode axial length is at least five times larger than said downstream cathode axial length.

3. The Hall thruster of claim 1, wherein the Hall thruster further comprises an electron emitter that is housed in the downstream section.

4. The Hall thruster of claim 1, wherein the Hall thruster further comprises a keeper electrode assembly that is housed in the downstream section.

5. The Hall thruster of claim 1, wherein the Hall thruster further comprises cathode propellant lines and/or electrical distribution lines housed in the upstream section.

6. The Hall thruster of claim 1, wherein the Hall thruster further comprises cathode propellant lines and/or electrical distribution lines formed via respective holes in an inner core of the Hall thruster parallel to the upstream section.

7. The Hall thruster of claim 1, further comprising a single-piece azimuthally-symmetrical magnetic screen, wherein: the azimuthally-symmetrical discharge chamber has an annular shape, and the single-piece azimuthally-symmetrical magnetic screen has an h-shape cross section, the h-shape cross section comprising a first prong at an upstream end and two prongs at a downstream end.

8. The Hall thruster of claim 1, wherein the downstream section comprises a cathode heater.

9. The Hall thruster of claim 1, wherein the downstream section is heaterless.

10. A method for increasing cross-sectional area of a center core in a magnetically shielded (MS) Hall thruster, the method comprising:
- forming a downstream bore, in a center core of a magnetic circuit of the MS Hall thruster, along a center axis of the MS Hall thruster;
- forming an upstream bore, in the center core of the MS Hall thruster along the center axis of the MS Hall thruster, the downstream bore having:
- a downstream bore diameter that is larger than an upstream bore diameter of the upstream bore, and a downstream bore length along the center axis that is shorter than an upstream bore length along the center axis of the upstream bore, and wherein the downstream bore is a counterbore of the upstream bore;
- providing an internally-mounted cathode having:
- an upstream section having an upstream cathode diameter and an upstream cathode axial length, wherein the upstream cathode diameter is an outermost diameter of the upstream section; and
- a downstream section having a downstream cathode diameter greater than the upstream cathode diameter and a downstream cathode axial length shorter than the upstream cathode axial length, wherein the downstream cathode diameter is an outermost diameter of the downstream section;
- inserting the internally-mounted cathode into the center core such that the downstream section is positioned within the counterbore, and the upstream section is positioned within the upstream bore.

11. The method according to claim 10, wherein the upstream bore length is at least five times larger the downstream bore length.

12. The method according to claim 10, wherein: the MS Hall thruster is a configured to generate thrust with less than 500 W of input power.

* * * * *